US011880767B2

(12) United States Patent
Price et al.

(10) Patent No.: US 11,880,767 B2
(45) Date of Patent: Jan. 23, 2024

(54) INCREASING ACCURACY AND RESOLUTION OF WEATHER FORECASTS USING DEEP GENERATIVE MODELS

(71) Applicant: ClimateAI, Inc., San Francisco, CA (US)

(72) Inventors: Ilan Shaun Posel Price, Oxford (GB); Stephan Rasp, Munich (DE)

(73) Assignee: ClimateAI, Inc., San Francisco, CA (US)

( * ) Notice: Subject to any disclaimer, the term of this patent is extended or adjusted under 35 U.S.C. 154(b) by 0 days.

(21) Appl. No.: 17/676,560

(22) Filed: Feb. 21, 2022

(65) Prior Publication Data

US 2023/0143145 A1 May 11, 2023

Related U.S. Application Data

(60) Provisional application No. 63/277,618, filed on Nov. 10, 2021.

(51) Int. Cl.
*G06N 3/08* (2023.01)
*G01W 1/10* (2006.01)
*G06N 3/045* (2023.01)

(52) U.S. Cl.
CPC .............. *G06N 3/08* (2013.01); *G01W 1/10* (2013.01); *G06N 3/045* (2023.01)

(58) Field of Classification Search
CPC .......... G06N 3/08; G06N 3/0454; G01W 1/10
See application file for complete search history.

(56) References Cited

U.S. PATENT DOCUMENTS

2022/0003895 A1* 1/2022 Choi ................. G01W 1/10
2022/0092433 A1* 3/2022 Liu ................... G06N 3/044

FOREIGN PATENT DOCUMENTS

WO WO-2021204913 A1 * 10/2021 ........... A01B 79/005

OTHER PUBLICATIONS

Wang et al. ("Fast and accurate learned multiresolution dynamical downscaling for precipitation", arXiv:2101.06813v1, Jan. 18, 2021) (Year: 2021).*

(Continued)

*Primary Examiner* — Ying Yu Chen
*Assistant Examiner* — Imad Kassim
(74) *Attorney, Agent, or Firm* — American Patent Agency PC; Daniar Hussain; Stephen M. Hou

(57) ABSTRACT

Embodiments of the present invention provide the use of a conditional Generative Adversarial Network (GAN) to simultaneously correct and downscale (super-resolve) global ensemble weather or climate forecasts. Specifically, a generator deep neural network (G-DNN) in the cGAN comprises a corrector DNN (C-DNN) followed by a super-resolver DNN (SR-DNN). The C-DNN bias-corrects coarse, global meteorological forecasts, taking into account other relevant contextual meteorological fields. The SR-DNN downscales bias-corrected C-DNN output into G-DNN output at a higher target spatial resolution. The GAN is trained in three stages: C-DNN training, SR-DNN training, and overall GAN training, each using separate loss functions. Embodiments of the present invention significantly outperform an interpolation baseline, and approach the performance of operational regional high-resolution forecast models across an array of established probabilistic metrics. Crucially, embodiments of the present invention, once trained, produce high-resolution predictions in seconds on a single machine.

20 Claims, 18 Drawing Sheets

(56) References Cited

OTHER PUBLICATIONS

Mittermaier et al. ("A long-term assessment of precipitation forecast skill using the Fractions Skill Score", Meteorol. Appl. 20: 176-186 (2013)) (Year: 2013).*

Ravuri et al. ("Skilful precipitation nowcasting using deep generative models of radar", Received: Feb. 17, 2021) (Year: 2021).*

Klemmer et al. ("Augmenting correlation structures in spatial data using deep generative models", May 23, 2019) (Year: 2019).*

Chen et al. ("Model-Free Renewable Scenario Generation Using Generative Adversarial Networks", IEEE Transactions on Power Systems, vol. 33, No. 3, pp. 3265-3275, May 2018) (Year: 2018).*

Ebert-Uphoff et al., "Cira Guide to Custom Loss Functions for Neural Networks in Environmental Sciences—version 1", Machine Learning (cs.LG), arXiv preprint arXiv:2106.09757, Jun. 17, 2021, pp. 1-37.

Gulrajani et al., "Improved Training of Wasserstein GANs", Machine Learning (cs.LG), arXiv preprint arXiv:1704.00028, Dec. 25, 2017, pp. 1-20.

Ledig et al., "Photo-Realistic Single Image Super-Resolution Using a Generative Adversarial Network", Computer Vision and Pattern Recognition, May 25, 2017, pp. 19.

Leinonen et al., "Stochastic Super-Resolution for Downscaling Time-Evolving Atmospheric Fields With a Generative Adversarial Network", IEEE Transactions on Geoscience and Remote Sensing, May 20, 2020, pp. 1-13.

Ravuri et al., "Skillful Precipitation Nowcasting using Deep Generative Models of Radar", Machine Learning (cs.LG), arXiv preprint arXiv:2104.00954, Apr. 2, 2021, pp. 1-46.

Roberts et al., "Scale-Selective Verification of Rainfall Accumulations from High-Resolution Forecasts of Convective Events", Monthly Weather Review, vol. 136, Issue 1, pp. 78-97.

Tim Palmer, "A Vision for Numerical Weather Prediction in 2030", Atmospheric and Oceanic Physics (physics.ao-ph), arXiv preprint arXiv: 2007:04830, Jul. 3, 2020, pp. 1-11.

Zhang et al., "Multi-Radar Multi-Sensor (MRMS) Quantitative Precipitation Estimation," Bulletin of the American Meteorological Society, vol. 97, Issue 4, Apr. 2016, pp. 621-638.

* cited by examiner

850

1100

1105 Start

1110
Pre-process global numerical weather forecast data to generate an ensemble of corrector input data at a first spatial resolution, wherein (1) the first spatial resolution is lower than a target spatial resolution (2) a generative adversarial network (GAN) comprises a generator deep neural network (G-DNN) and a discriminator (D-DNN), (3) the G-DNN comprises a corrector (C-DNN) followed by a super-resolver (SR-DNN) having an output spatial resolution at the target spatial resolution, and (4) the generated ensemble of corrector input data comprises data for a target meteorological variable and at least one context meteorological variable different from the target meteorological variable

1120
Down-sample observational data for the target meteorological variable from a second spatial resolution to the first spatial resolution, wherein the second spatial resolution is higher than the first spatial resolution, and wherein the observational data corresponds to the ensemble of corrector input data over geopatch-time indices

1130
Train the C-DNN, using a first loss function computed based on a first C-DNN output generated from the ensemble of corrector input data, and the down-sampled observational data

FIG. 11

1140
Train the SR-DNN, using a second loss function computed based on the first C-DNN output, the down-sampled observational data, a first SR-DNN output generated from the first C-DNN output, and the observational data for the target meteorological variable

1150
Train the GAN, using a third loss function computed based on a second C-DNN output generated from the ensemble of corrector input data and a random vector input 1160 End

INCREASING ACCURACY AND RESOLUTION OF WEATHER FORECASTS USING DEEP GENERATIVE MODELS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of climate and weather forecasting, and pertain particularly to methods and systems for increasing the accuracy and resolution of precipitation forecasts using deep generative models.

BACKGROUND OF THE INVENTION

The background of the invention section is provided merely to help understand the context of the invention and its application and uses, and may not be considered prior art.

Weather prediction and climate forecasting are extremely important in protecting human lives and property, in maintaining public health and safety, and in socioeconomic decision making and planning. For example, heavy rainfall is one of the most impactful weather extremes, causing substantial economic losses and physical harm each year across the globe. As climate change progresses, projections show that precipitation extremes will become more frequent and intense. Early and accurate whether predictions such as warnings for extreme precipitation are crucial for limiting resulting damages and losses.

Most heavy precipitation is the result of small-scale ($\approx 1$ km) air motions, for example in thunderstorms. However, weather forecasts in large parts of the globe are based on global numerical weather models that have grid spacings of 10 km or larger. Consequently, these models often do a poor job of resolving extreme precipitations, leading to washed out forecasts. To avoid this, individual countries are running regional, high-resolution weather models that are better able to represent the phenomena leading to extreme rainfall. This regional high-resolution modeling approach provides more accurate forecasts than its global counterpart, but has several drawbacks. First, regional models are very labor intensive to develop and run. National weather centers typically employ dozens of scientists for this task. Second, high-resolution models are computationally expensive, taking hours on large super-computing clusters. Third, these models still exhibit errors, and they are not directly informed by observations, such as weather radars. Lastly, because of the difficulty of running regional high-resolution models, only wealthy nations are able to maintain such services, leaving a large part of the globe without high-resolution weather forecasts. This is especially problematic because extreme precipitation strongly affects poorer nations.

To generate high-resolution forecasts, probabilistic post-processing of weather forecasts may be implemented to produce independent, univariate distributions over individual pixels on a forecast map (known as univariate methods), or to include conditional dependencies between pixels (known as multivariate methods). These methods are suitable for the prediction over a single location, but insufficient when there are substantial risks associated with weather events in large and contiguous regions (e.g., in a catchment area for rainfall, with the potential for heavy flooding). A univariate forecast may be converted into a multivariate forecast using a global ensemble post hoc to sample the post-processed forecast, but unreliable spatial information of the coarse input, especially for precipitation, has problematic impacts on the accuracy of the results. Other studies have looked at generative modeling approaches such as Gaussian Random fields, normalizing flows, and latent neural processes. However, these approaches struggle with modeling fine-grained structures, which are exhibited by precipitation on short time horizons.

More recently, Generative Adversarial Networks (GANs) have been considered to produce stochastic super-resolved precipitation fields. For example, taking as input a low-resolution time-series sequence of the observed precipitation in a given area, outputs may be generated as time-consistent, high-resolution, stochastic samples of the precipitation field over the same time period. Very short-term "nowcasting" has also been done based on high-resolution observations collected in the immediate past. However, these models are all trained and evaluated on precipitation observations, with low resolutions over the same time period, or high resolutions immediately before the forecasting period, which in practice are typically inaccessible.

Therefore, in view of the aforementioned difficulties, there is an unsolved need to develop a low-cost, fast, and robust system for increasing the accuracy and resolution of weather forecasts. It is against this background that various embodiments of the present invention were developed.

BRIEF SUMMARY OF THE INVENTION

Methods, systems, and apparatus are provided for generating an ensemble of high-resolution forecasts of a climate variable from low-resolution forecasts of the given climate variable, using a conditional generative adversarial deep neural network (cGAN). In one aspect, one embodiment of the present invention is a method for training the cGAN.

In one aspect, one embodiment of the present invention is a method for training a generative adversarial network (GAN) for correcting and downscaling global numerical weather forecast data to generate an ensemble of forecast data for a target meteorological variable at a target spatial resolution, comprising: pre-processing the global numerical weather forecast data to generate an ensemble of corrector input data at a first spatial resolution, wherein the first spatial resolution is lower than the target spatial resolution, wherein the GAN comprises a generator deep neural network (G-DNN) and a discriminator deep neural network (D-DNN), wherein the G-DNN comprises a corrector deep neural network (C-DNN) followed by a super-resolver deep neural network (SR-DNN) having an output spatial resolution at the target spatial resolution, and wherein the generated ensemble of corrector input data comprises data for the target meteorological variable and at least one context meteorological variable different from the target meteorological variable; down-sampling observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices; training the C-DNN, using a first loss function computed based on a first C-DNN output generated from the ensemble of corrector input, and the down-sampled observational data; training the SR-DNN, using a second loss function computed based on the first C-DNN output, the down-sampled observational data, a first SR-DNN output generated from the first C-DNN output, and the observational data for the target meteorological variable; and training the GAN, using a third loss function computed based on a second C-DNN output generated from the ensemble of corrector input and a random vector input.

In some embodiments, the method further comprises generating the ensemble of forecast data for the target meteorological variable at the target spatial resolution, using the G-DNN. In some embodiments, the method further comprises generating a probabilistic forecast from the ensemble of forecast data for the target meteorological variable at the target spatial resolution.

In some embodiments, the target meteorological variable is precipitation accumulation, and wherein the at least one context meteorological variable is surface temperature, convective available potential energy, convective inhibition, or column water.

In some embodiments, the first loss function is computed further based on a fractions skill score generated from the first C-DNN output and the down-sampled observational data. In some embodiments, the third loss function is computed further based on the down-sampled observational data.

In some embodiments, the method further comprises weighted sampling the ensemble of corrector input data and the observational data.

In some embodiments, the C-DNN has a same input and output spatial resolution, and wherein the SR-DNN has an input spatial resolution at the first spatial resolution.

In another aspect, one embodiment of the present invention is a system for training a generative adversarial network (GAN) for correcting and downscaling global numerical weather forecast data to generate an ensemble of forecast data for a target meteorological variable at a target spatial resolution, comprising: at least one processor; and a non-transitory physical storage medium for storing program code and accessible by the processor, the program code when executed by the processor causes the processor to: pre-process the global numerical weather forecast data to generate an ensemble of corrector input data at a first spatial resolution, wherein the first spatial resolution is lower than the target spatial resolution, wherein the GAN comprises a generator deep neural network (G-DNN) and a discriminator deep neural network (D-DNN), wherein the G-DNN comprises a corrector deep neural network (C-DNN) followed by a super-resolver deep neural network (SR-DNN) having an output spatial resolution at the target spatial resolution, and wherein the generated ensemble of corrector input data comprises data for the target meteorological variable and at least one context meteorological variable different from the target meteorological variable; down-sample observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices; train the C-DNN, using a first loss function computed based on a first C-DNN output generated from the ensemble of corrector input, and the down-sampled observational data; train the SR-DNN, using a second loss function computed based on the first C-DNN output, the down-sampled observational data, a first SR-DNN output generated from the first C-DNN output, and the observational data for the target meteorological variable; and train the GAN, using a third loss function computed based on a second C-DNN output generated from the ensemble of corrector input and a random vector input.

In some embodiments, the program code when executed by the processor further causes the processor to generate the ensemble of forecast data for the target meteorological variable at the target spatial resolution, using the G-DNN. In some embodiments, the program code when executed by the processor further causes the processor to generate a probabilistic forecast from the ensemble of forecast data for the target meteorological variable at the target spatial resolution.

In some embodiments, the target meteorological variable is precipitation accumulation, and wherein the at least one context meteorological variable is surface temperature, convective available potential energy, convective inhibition, or column water.

In some embodiments, the first loss function is computed further based on a fractions skill score generated from the first C-DNN output and the down-sampled observational data. In some embodiments, the third loss function is computed further based on the down-sampled observational data.

In some embodiments, the program code when executed by the processor further causes the processor to weighted sample the ensemble of corrector input data and the observational data.

In some embodiments, the C-DNN has a same input and output spatial resolution, and wherein the SR-DNN has an input spatial resolution at the first spatial resolution.

In yet another aspect, an embodiment of the present invention is a non-transitory physical storage medium for training a generative adversarial network (GAN) for correcting and downscaling global numerical weather forecast data to generate an ensemble of forecast data for a target meteorological variable at a target spatial resolution, the storage medium comprising program code stored thereon, that when executed by a processor causes the processor to: pre-process the global numerical weather forecast data to generate an ensemble of corrector input data at a first spatial resolution, wherein the first spatial resolution is lower than the target spatial resolution, wherein the GAN comprises a generator deep neural network (G-DNN) and a discriminator deep neural network (D-DNN), wherein the G-DNN comprises a corrector deep neural network (C-DNN) followed by a super-resolver deep neural network (SR-DNN) having an output spatial resolution at the target spatial resolution, and wherein the generated ensemble of corrector input data comprises data for the target meteorological variable and at least one context meteorological variable different from the target meteorological variable; down-sample observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices; train the C-DNN, using a first loss function computed based on a first C-DNN output generated from the ensemble of corrector input, and the down-sampled observational data; train the SR-DNN, using a second loss function computed based on the first C-DNN output, the down-sampled observational data, a first SR-DNN output generated from the first C-DNN output, and the observational data for the target meteorological variable; and train the GAN, using a third loss function computed based on a second C-DNN output generated from the ensemble of corrector input and a random vector input.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings. In these drawings, each identical or nearly identical component that is illustrated in various figures is represented by a reference number. For purposes of clarity, not every component is labeled in every drawing. The drawings are not necessarily drawn to scale, with emphasis instead being placed on illustrating various aspects of the techniques and devices described herein.

FIG. 11 is an exemplary flow diagram for a process to train an exemplary cGAN-based weather forecast correction and downscaling engine, according to some embodiments of the present invention.

DETAILED DESCRIPTION OF THE INVENTION

Figure 1:
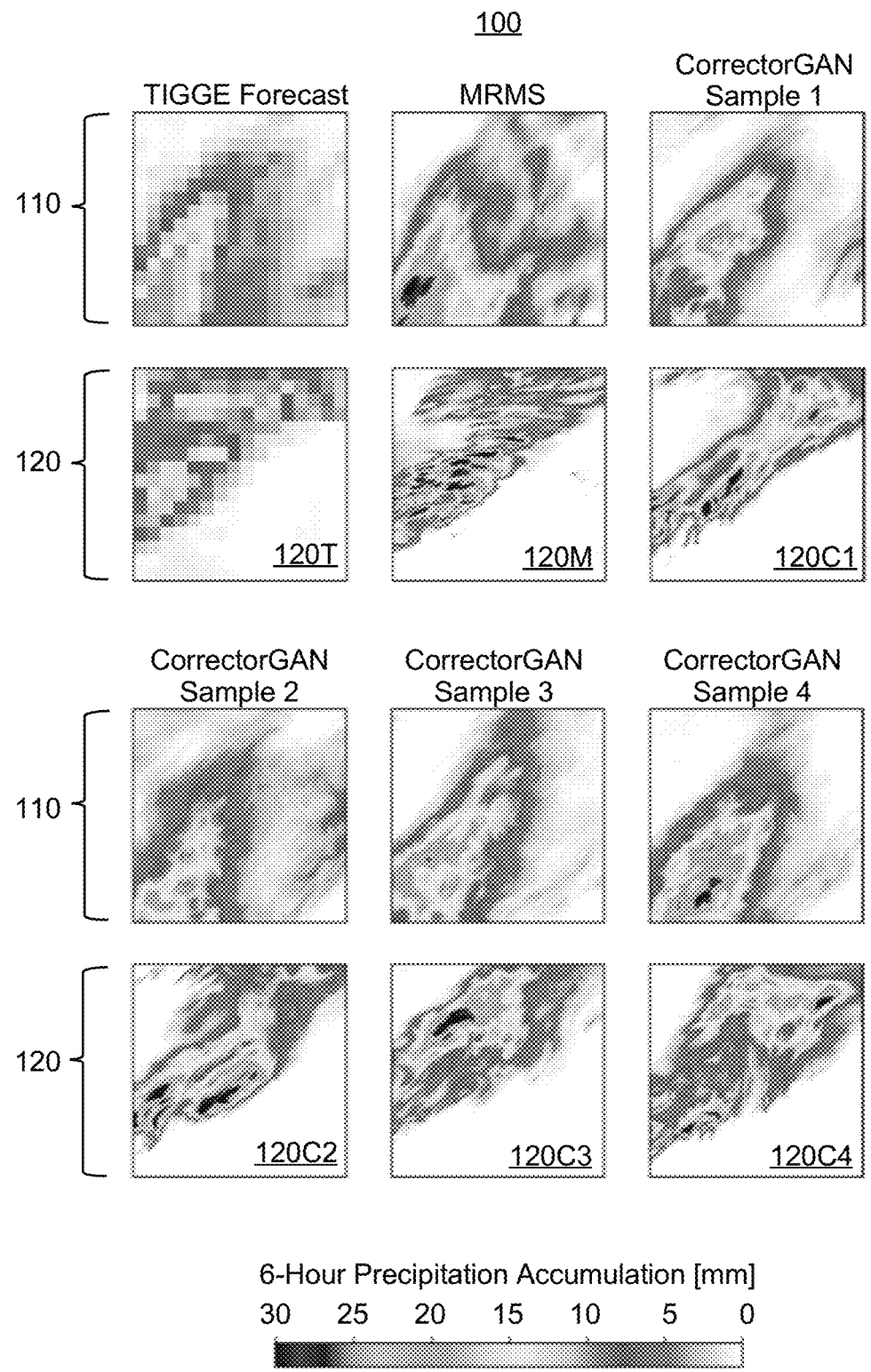
FIG. 1 illustrates two sets of forecast samples generated by an exemplary implementation of a conditional generative adversarial deep neural network (cGAN)-based weather forecast correction and downscaling system CorrectorGAN, alongside random ensemble members of the corresponding low-resolution global model forecast (TIGGE) and high-resolution ground truth (MRMS), according to some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

CLIMATEAI is a trademark name carrying embodiments of the present invention, and hence, the aforementioned trademark names may be interchangeably used in the specification and drawing to refer to the products/services offered by embodiments of the present invention. The term CLIMATEAI may be used in this specification to describe implementations of an overall weather prediction and/or climate forecasting platform, a forecast correction and downscaling system, as well as the company providing said platforms and systems. With reference to the figures, embodiments of the present invention are now described in detail.

Overview of the CLIMATEAI CorrectorGAN Forecast Correction and Downscaling System The CLIMATEAI system is a data-driven approach to correcting and downscaling (i.e. increasing the resolution of) global weather or climate model predictions using deep generative networks. "Downscaling" is a process to infer high-resolution information from low-resolution information. In meteorology and climatology, this is the process of taking information at large scales to make predictions at smaller, local scales, typically in spatial resolution, but also often in temporal resolution. Downscaling in climatology is not the same as interpolation-based up-sampling in general digital signal processing systems, as the resulting high-resolution forecasts should also confer to other local regional factors such as terrain or surface hydrology. There are two main approaches to downscaling in climatology: dynamical downscaling and statistical downscaling. Dynamical downscaling runs high-resolution regional numerical models, using observational data or low-resolution global numerical model outputs as boundary conditions to extrapolate the effects of large-scale processes into finer scales. Numerical weather prediction (NWP) models and Global climate models (GCMs) are mathematical models that simulate complex dynamic processes in the general circulation of the planetary atmosphere and/or ocean, to generate short-term weather predictions or long-term climate forecasts. Statistical downscaling studies statistical relationships between large-scale climate processes and local climate variables, and applies such relationships to the output of global models to provide statistically refined local climate and/or weather predictions.

Embodiments of the CLIMATEAI system use deep generative models to statistically downscale, and map directly from a global numerical weather or climate model's multi-variable coarse-resolution prediction fields to inferred distributions over high-resolution fields, from which ground truth observations, such as radar observations, are a sample. In this disclosure, a "field" refers to a discrete 2D scalar field that associates scalar values with geographical coordinates such as latitude/longitude. For example, a precipitation field is a grid with precipitation values at each grid point. In the present disclosure, precipitation (e.g., 6-hour precipitation accumulation) is used as an non-limiting, illustrative meteorological variable in exemplary embodiments to show how the CLIMATEAI system may be implemented to correct and downscale low spatial resolution forecast data into high spatial resolution forecast data, but it should be understood that other meteorological variables (e.g. 1-hour precipitation accumulation, surface temperature, sea-level pressure, wind at 10 m etc.) and meteorological fields, may be similarly corrected, downscaled in spatial and/or temporal resolution, and estimated.

When deployed, embodiments of the CLIMATEAI system produce ensembles of realistic-looking, plausible weather forecast output fields that have higher resolution than input forecast fields, and such ranges of plausible forecast outputs allow the computation of the probabilities of a meteorological event (e.g., extreme precipitation) occurring within a target forecast lead time. In meteorology, an ensemble weather forecast is a set of forecasts representing the range of future weather possibilities, typically generated with slight variations in initial conditions and weather model perturbations that represent the inherent chaotic nature of the atmosphere and uncertainties in the initial conditions as well as the weather model approximations. An ensemble of weather forecasts represent a range of possible weather conditions and scenarios. The CLIMATEAI system approximates a true underlying distribution of the meteorological field (e.g., precipitation field) at a given time over a geographical area or geopatch (e.g., 6-hour precipitation accumulation in 12 hours over a given 512 km×512 km area), using information from an ensemble of low-resolution global model forecasts for that area and its surrounding. This is a difficult task, as it requires simultaneously correcting biases and errors in low-resolution global model forecasts, super-resolving the global model forecasts into plausible high-resolution fields, and learning the variability in the underlying true distribution so that the generated distributions constitute realistic and reliable probabilistic forecasts.

In analytical terms, embodiments of the CLIMATEAI system models the aforementioned true underlying distribution of meteorological fields at a given time over a given geopatch as a conditional distribution. For example, denote pairs of (low-resolution precipitation forecast, high-resolution precipitation observation) as $(x_i, y_i)$, where i indexes geopatch-time pairs, and $y_i$ has the probability distribution of $P_i$, which is the true distribution over precipitation fields at geopatch-time i. The CLIMATEAI system models $P_i$ as a conditional distribution $P(y|x_i)$, and uses a conditional generative adversarial network (cGAN) in which the generator learns to approximate this conditional distribution, enabling the sampling of any number k of high-resolution forecasts $\{\hat{y}_i^1, \ldots, \hat{y}_i^k\}$.

In what follows, the combination of a conditional generative adversarial network (cGAN)-based system, called a "CorrectorGAN" system, and associated training regime are described. When deployed for inferencing, the CorrectorGAN system generates an ensemble of plausible high-resolution predictions from low-resolution forecasts. That is, ensembles of high-resolution forecast data covering a time span T are generated from a low-resolution input forecast data set covering the same time span. To accomplish this, a novel two-stage architecture is disclosed. First, the coarse forecast is bias or error corrected, and mapped to a corrected distribution based on information about the weather situation. Then, this distribution is mapped to a distribution of high-resolution, plausible predictions. To train the deep generative neural networks involved, multiple training stages are performed on high-resolution observation data, under the dual objectives of stochastic forecast correction and super-resolution. In one embodiment, a three-stage training procedure includes low-resolution correction, high-resolution pretraining, and overall cGAN training.

When compared to a simple baseline and a state-of-the-art high-resolution regional forecasting system over the Continental United States, using a range of well-established metrics such as reliability diagram, brier score, and continuous ranked probability score, embodiments of the present invention significantly outperform the simple baseline and approaches the performance of the high-resolution regional model at a tiny fraction of the cost and effort. More importantly, this CorrectorGAN system produces predictions in seconds on a single machine, enabling evaluation against relevant baselines in a setup that closely resembles an operational environment. Thus, embodiments of the present invention may replace regional weather models that only dynamically downscale coarser models at immense computationally expenses, and may allow the transfer of data-driven downscaling and correction methods to from an area like the United States, which has established radar-observation networks, to data-poor regions that so far have had no access to high-resolution, good quality forecasts, yet are most affected by extreme weather like heavy precipitation.

As an illustrative example, FIG. 1A shows two instances 110 and 120 of 6-hour precipitation accumulation high-resolution (4 km×4 km) forecasts generated by Corrector-GAN over a 512 km×512 km geopatch, alongside random ensemble members of the corresponding low-resolution (32 km×32 km) global model forecast from the THORPEX Interactive Grand Global Ensemble (TIGGE) run by the European Center for Medium-Range Weather Forecasting (ECMWF), and high-resolution ground truth as collected by the Multi-Radar/Multi-Sensor System (MRMS) developed by the United States National Severe Storms Laboratory and deployed by the National Center for Environmental Prediction (NCEP). The TIGGE forecasts are available at 32 km resolution, here presented on 16×16 patches, while the MRMS data are collected at 4 km resolution, and presented on corresponding 128×128 patches over the same geographical region. Input to CLIMATEAI's CorrectorGAN model include low-resolution precipitation forecast 120T in FIG. 1, air temperature at 2 meters above the surface (2m temperature), convective available potential energy, and convective inhibition TIGGE fields, all at TIGGE's 32 km resolution. The TIGGE forecasts are most accurate over the 6-12 h window, with the first few forecast hours being contaminated by spin-up effects.

A simple visual comparison of the sub-diagrams in FIG. 1 shows the CorrectorGAN system generates, from the low-resolution TIGGE forecast data such as 120T, high-resolution forecasts such as 120C1, 120C2, 120 C3, and 120C4 that well match the ground truth MRMS radar precipitation data such as 120M. Probabilistic predictions may be further generated by post-processing CorrectorGAN output samples. In the next sub-section, an overview of global numerical modeling and the MRMS system will be provided to help understand the novel design and key advantages of the CorrectorGAN system, before diving into details of its system architecture and training processes.

Introduction to Numerical Weather Prediction and Climate Forecasting Based on Global Models Numerical weather prediction (NWP) models and Global climate models (GCMs) are mathematical models that simulate complex dynamic processes in the general circulation of the planetary atmosphere and/or ocean, to generate short-term weather predictions and/or long-term climate forecasts. Weather refers to short term atmospheric conditions while climate is the weather of a specific region averaged over a long period of time.

General circulation models rely on fundamental physical principles such as the laws of thermodynamics and fluid dynamics, and use mathematical equations to integrate and simulate physical, chemical, and biological mechanisms that influence global weather and/or climate. With observational data as initial or boundary conditions, such models can provide historical, present, and/or future simulations of the global weather and/or climate patterns. More specifically, a global numerical meteorological model breaks the globe into a finite number of three-dimensional boxes, and imposes complex mathematical equations in each box to represent the evolution of and interactions among different meteorological system components. For example, the Navier-Stokes Equations are a set of coupled differential equations that describe how the velocity, pressure, temperature, and density of a moving fluid such as atmospheric gases and ocean currents are related.

Figure 2:
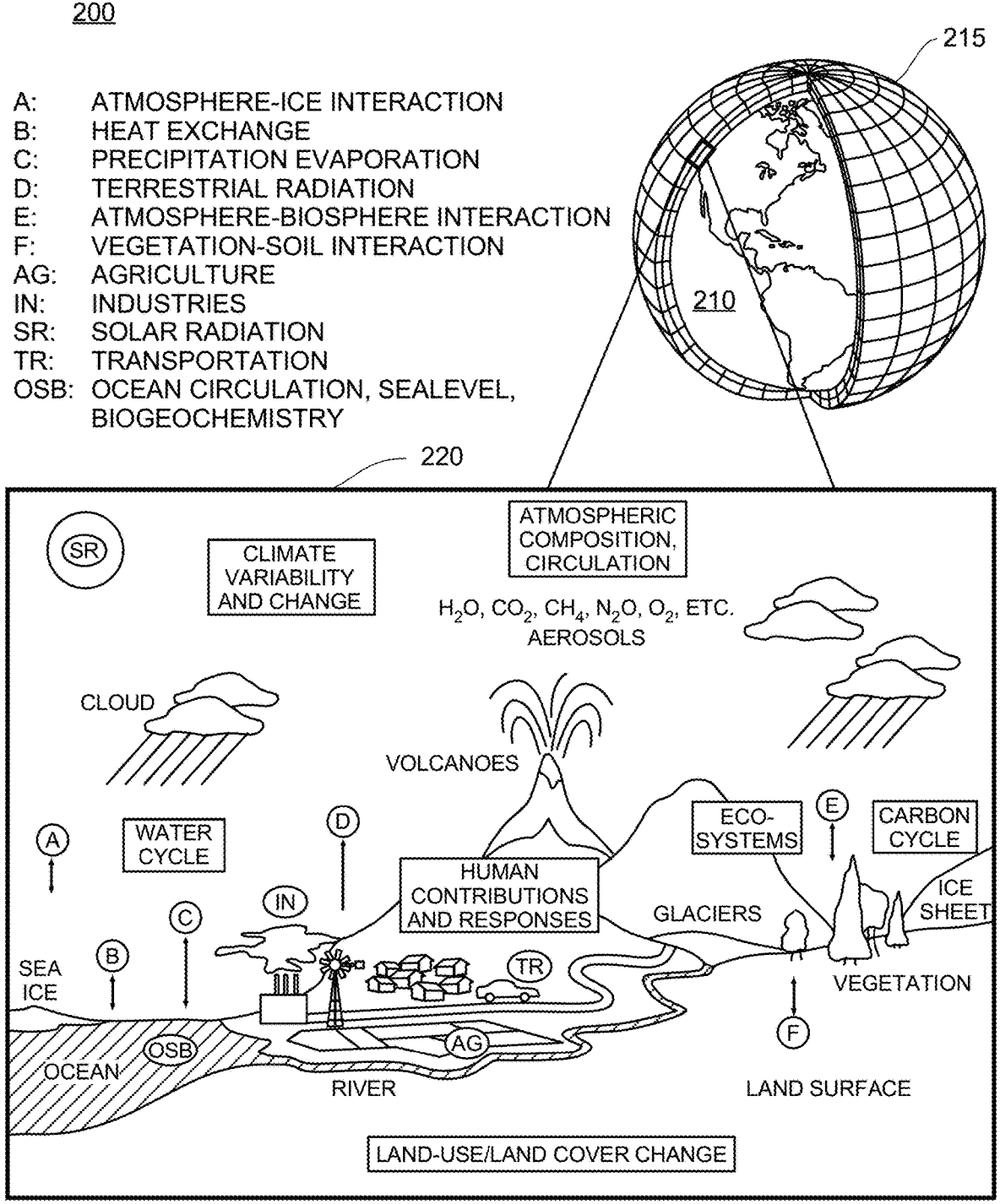
FIG. 2 is a schematic diagram illustrating grid cells used by a coupled atmospheric-ocean general circulation model, and processes considered in the atmosphere and at the Earth's surface.

FIG. 2 is a schematic diagram 200 illustrating grid cells used by an atmosphere-ocean coupled general circulation model (AOGCM), which can be used as a global forecast model for generating meteorological predictions for future times at given locations and altitudes, and physical processes considered within each grid cell (From the National Oceanic & Atmospheric Administration, Geophysical Fluid Dynamics Laboratory). In this AOGCM, the earth 210 is divided into 3D grids 215 according to latitude, longitude, and height or pressure, and a pull-out image 220 shows different processes that may be modeled within each grid cell, with interactions among neighboring cells (e.g., vertical exchanges between levels, and/or horizontal exchanges between columns) imposed as boundary conditions. Pull-out image 220 illustrates various components that are taken into account by the AOGCM, including the atmospheric component (clouds, aerosols/chemicals, etc.), the land surface component (vegetation, snow cover, surface hydrology etc.), the ocean component (current circulation, heat and carbon transfer, etc.), the sea ice component (solar radiation absorption, air-sea heat and water exchange), and external forcing factors such as human contributions in terms of gas emissions from cars and factories. For global weather forecasting, grid spacing may be on the scale of 10-40 km, while timesteps may be on the scale of 5-30 minutes. In the atmospheric column, exemplary meteorological variables under simulation may include wind vectors, humidity, temperature, precipitation, and aerosols. At the Earth's surface, exemplary meteorological variables under simulation may include surface temperature, humidity, pressure, heat fluxes, radiation, and the like.

It is easy to see from FIG. 2 that higher spatial and temporal resolutions provide higher accuracy in numerical modeling and forecasting, but complexity of the model and amount of numerical data thus generated would grow exponentially. For example, with 1.25 degrees in latitude and longitude and 20 vertical levels, the total number of variables modeled could be in the millions range, and data generated would be petabytes in size. Such extensive simulations are only feasible at a few meteorological research institutions and operational agencies. The two best-known numerical weather prediction models are the United States National Weather Services' Global Forecast System (GFS), and the European Center for Medium-Range Weather Forecasts (ECMWF)'s model, with the latter being more accurate for global weather forecasts.

In what follows, illustrative embodiments of the CLIMATEAI CorrectorGAN system and its sub-systems are presented. It would be understood by persons of ordinary skill in the art that the block diagrams, schematics, and flowchart illustrations as presented herein may be implemented in the form of a computer program product, a hardware product, a combination of computer program and hardware product, and/or apparatus, systems, computing devices, and/or the like to execute instructions, operations, process steps as presented. Thus, embodiments of the present invention may be implemented as computer program products comprising articles of manufacture, such as a non-transitory computer-readable storage medium storing program codes, executable instructions, and/or the like. Embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Embodiments of the present disclosure may also take the form of an entirely hardware embodiment, an entirely computer program product embodiment, and/or an embodiment that comprises combination of computer program products and hardware performing certain steps or operations.

System Architecture

Figure 3:
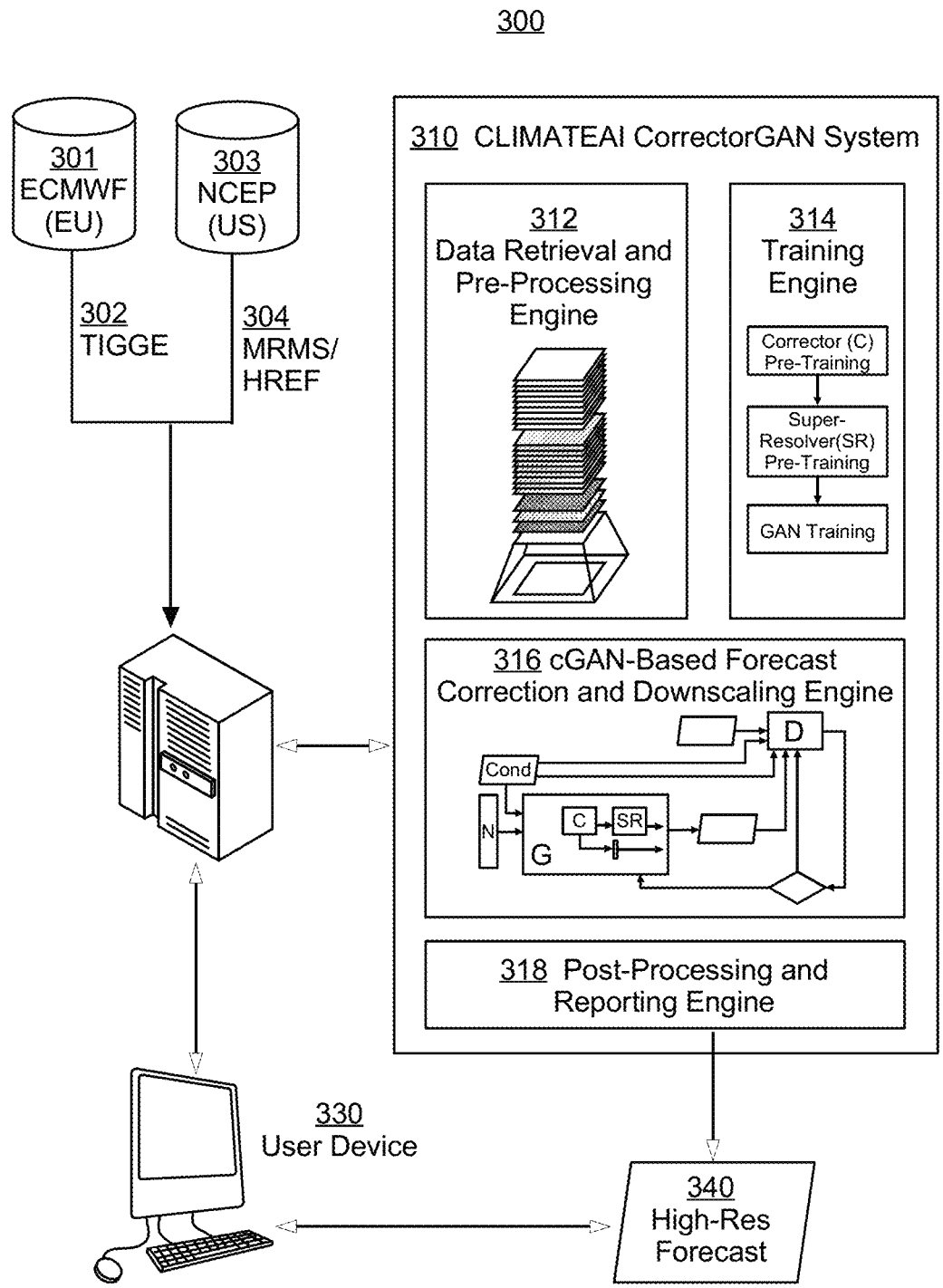
FIG. 3 is an exemplary architecture diagram for a CorrectorGAN system, according to some embodiments of the present invention.

FIG. 3 is an exemplary architecture diagram 300 for an illustrative conditional generative adversarial network (cGAN))-based weather forecast correction and downscaling system CorrectorGAN, according to some embodiments of the present invention. A CLIMATEAI CorrectorGAN system or sever 310 may be communicatively connected to multiple domestic and international meteorological research institutions and operational agencies such as the European Centre for Medium-Range Weather Forecasts (ECMWF) 301, and the United States National Centers for Environmental Prediction (NCEP) 303. One or more global numerical weather prediction data such as High-Resolution Ensemble Forecast (HREF) 304, or Multi-Radar/Multi-Sensor observation data (MRMS) may be retrieved and stored locally at CLIMATEAI server 310.

In various embodiments, CLIMATEAI system 310 may comprise one or more of a data retrieval and pre-processing engine 312, a training engine 314, a conditional generative adversarial network (cGAN)-based forecast correction and downscaling engine 316, and a post-processing and reporting engine 318. An "engine" here refers to a logical or physical software and/or hardware module with an encapsulated block of functionality. Each module of the CorrectorGAN System as shown in FIG. 3 may be implemented on a CLIMATEAI Server, a user device such as 330, individually or collectively.

As will be discussed with reference to FIGS. 4 to 6, data retrieval and pre-processing by engine 312 comprises steps such as masking, regridding, downsampling, sample weighting, combination, and/or interpolation. Different data pre-processing steps may be performed for training data to be used by training engine 314, and inference input data to cGAN-based forecast correction and downscaling Engine 316.

cGAN-based forecast correction and downscaling engine 316 comprises one or more deep generative artificial neural networks to map its input to an ensemble or array of high-resolution predictions/realizations. Compared to downscaling systems that take as input a low-resolution (i.e., down-sampled) set of observations and perform stochastic super-resolution to generate high-resolution forecasts, cGAN-based forecast correction and downscaling engine 316 performs both stochastic model correction and super-resolution to generate ensembles of high-resolution forecasts from low-relation forecasts. Note that using low-resolution ground truth observation as input to generate high-resolution forecasts is impractical, as in real-life there is no access to low-resolution ground truth observations at the time of forecast.

In general GAN systems, a generator neural network (G) and a discriminator neural network (D) compete in a zero-sum game, and combinations of residual blocks increase the resolution of the input data progressively to generate or synthesize fake outputs that are hard to distinguish from real data. However, as will be discussed with reference to FIGS. 7, 8A, 8B and 9, the generator network in engine 316 comprises a corrector network (C) followed by a super-resolver network (SR). An additional offshoot branch from the corrector generates an additional low-resolution forecast, while in parallel, the corrector output goes through the main super-resolver (SR) track of the architecture to increase data resolution. That is, the generator network in embodiments of the present invention generates two separate outputs: an intermediary low-resolution output, and a high resolution output. This intermediary low-resolution output may be used for error correction during training: if this output indicates precipitation somewhere that is known to not rain through radar observations, then error correction would take place.

Taken into account of the intermediary low-resolution output and the final high-resolution output of the generator network, loss functions within CLIMATEAI's cGAN are designed to penalize wrong low-resolution forecasts, to correct large-scale errors in the low-resolution forecasts, and to penalize unrealistic high-resolution forecasts that are out of sync with the real distribution of what have actually been observed. Unlike conventional GANs that aim to generate only realistic-looking output images, this novel design ensures that the forecast output is reliable and meaningful, which are important characteristics desired in weather forecast.

Training engine 314 trains the cGAN-based forecast correction and downscaling engine 316 on high-resolution observation data, through three stages: two pre-training stages and a third full training stage. A first low-resolution correction stage trains the corrector network C on down-sampled high-resolution data to generate the low-resolution output for generator G. The second high-resolution pre-training stage trains the super-resolver network SR within the generator G, for example using basic L1 error losses. This step does not involve adversarial training, but rather matches up areas of meteorological events, to make the network learn different geographical areas with different characteristics (e.g., intensity) for the target meteorological events (e.g., rain/precipitation). The last and third stage of training includes the discriminator D so the generator G competes with the discriminator D by learning to generate high-resolution outputs that can fool the discriminator D, which itself attempts to distinguish what the model provides and what really happens.

Once trained, validated and tested, the cGAN-based forecast correction and downscaling engine 316 may be deployed in a target meteorological forecasting application, that is, to generate ensembles of realistic-looking high-resolution meteorological forecasts from multi-variable low-resolution meteorological forecasts produced by other global low-resolution weather model ensembles, and to produce reliable probabilistic weather predictions from the generated ensembles.

Post-processing and Reporting engine 318 may further post-process, format, and plot forecasting results 340, for display on a user device 330.

Data Retrieval and Pre-Processing: Exemplary Input, Training, and Baseline Forecast Data Precipitation is used as a non-limiting, illustrative meteorological variable in exemplary embodiments in this disclosure to show how the CLIMATEAI CorrectorGAN system may be implemented, but it should be understood that other meteorological variables can be similarly corrected, downscaled, and estimated. Specially, in what follows, 6-hour precipitation accumulation at 12-hour lead-time is considered, with forecast data representing how much rain accumulates between hour 6 and hour 12 starting from a given time.

Weather-radar estimates of precipitation obtained by the Multi-Radar/Multi-Sensor (MRMS) system at 4 km resolution is used as the ground truth precipitation values. Embodiments of the CLIMATEAI system aim to generate high-resolution samples from this ground truth distribution, based on low-resolution global ensemble forecasts.

For illustration only and not limiting the scope of the invention to the particular downscaling application and implementation shown, exemplary data sets processed by data retrieval and pre-processing engine 312 in FIG. 3, and used in the training and deployment of the CLIMATEAI system, are now described.

Input Data During Training and Deployment: TIGGE

Embodiments of the CLIMATEAI CorrectorGAN system may use, as input, global ensemble forecast results from established forecast systems. For example, some embodiments may use the one run by the European Center for Medium-Range Weather Forecasting (ECMWF), available through the open-source THORPEX Interactive Grand Global Ensemble archive, henceforth called "TIGGE". This raw data comes at ~0.13° resolution, which may be regridded bi-linearly by engine 312 to 0.3T resolution. TIGGE forecasts are initialized at 00 and 12UTC each day, but the TIGGE forecasts are the most accurate over the 6-12 h window, with the first few forecast hours being contaminated by spin-up effects.

Note while kilometer (km) is used as the unit of measurement throughout the present disclosure, the original data from regional forecast models and radar observations are in degrees. An approximate conversion of 0.01 degree (0.01°) to 1 km is implied.

During training, validation, and deployment, input variables to cGAN-based engine 316 may include, but are not limited to, precipitation, air temperature at 2 meters above the surface (2m temperature), convective available potential energy, and convective inhibition TIGGE fields, on 16×16 patches of the TIGGE forecast ensemble (i.e., over 512 km×512 km geopatches at 32 km resolution). Precipitation is accumulated over the 6 to 12 hour window. TIGGE is most accurate in this window because the first few forecast hours are typically contaminated by spin-up effects.

During training and validation, intermediate and final outputs from CorrectorGAN engine 316 are compared to corresponding 128×128 patches of MRMS data at 4 km resolution (i.e., over the same 512 km×512 km geopatches). In one embodiment, MRMS data from 2018 and 2019 are used for training and validation, while MRMS data from 2020 are used for evaluation.

Figure 4:
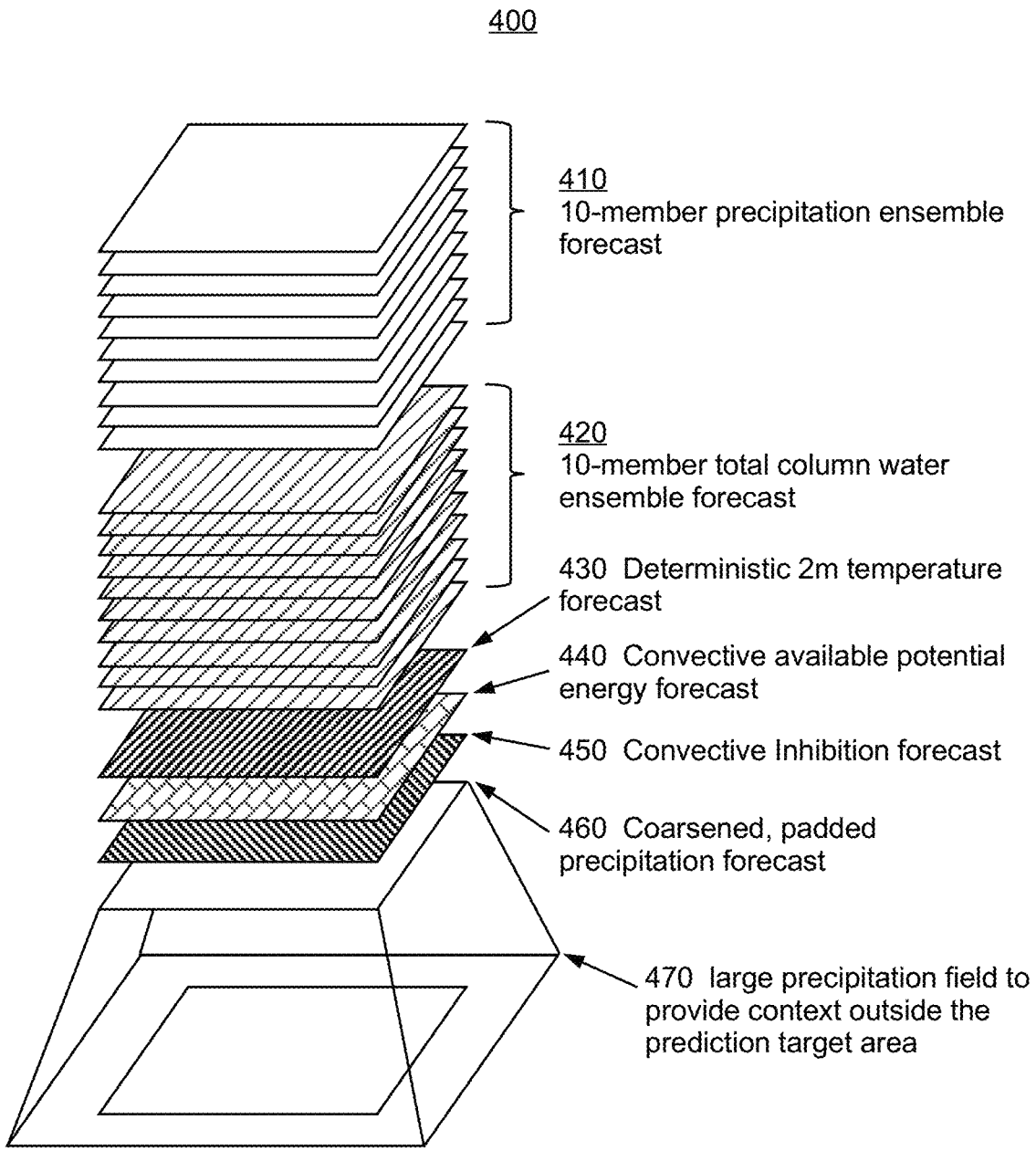
FIG. 4 illustrates a channel breakdown of exemplary input data supplied to the CorrectorGAN system in FIG. 4, according to some embodiments of the present invention.

FIG. 4 illustrates a channel breakdown of exemplary input data supplied to the generator network in cGAN-based engine 316 in FIG. 3, according to some embodiments of the present invention. In this example, each input geopatch of size 512 km×512 km has 24 channels: the first 10 channels 410 are TIGGE precipitation forecast ensemble members; the next 10 channels 420 are TIGGE total column water forecast ensemble members; the next three channels 430, 440, and 450 are respective TIGGE 2m temperature, convective available potential energy, and convective inhibition forecasts taken from the deterministic forecast. These additional variables and their ensembles may be included to provide additional information on the basis of which the cGAN can correct model errors. That is, since precipitation forecasting is uncertain, CorrectorGAN looks at an ensemble of different realizations of low-resolution forecast to determine the possibility of rain in different geographical regions. Other variables, like temperature and moisture, determine the likelihood of rainfall, and therefore are used as input as well to provide contextual information for low-resolution precipitation forecasts. The final channel 460 is a down-sampled version of a larger patch 470 of size 46×46 of a TIGGE precipitation forecast ensemble member. That is, the central 16×16 patch, extended on each side by 15 pixels. This last channel 460 is included to provide the model with some context on the wider precipitation field outside of the prediction target area.

For training, all (low-resolution precipitation forecast, high-resolution precipitation observation), or ($x_i$, $y_i$) pairs may be pre-processed by first going through a zero-preserving log transform, then shifted and scaled to lie in [0,1]. However, evaluation maybe performed on the raw data absent normalization and transformation.

Weighted Sampling During Training

It may be observed that typically a large part of patches have no or very little precipitation. In response, the training dataset may be balanced by preferentially sampling observational data patches with more precipitation. For example, for each patch, the fraction of grid point with precipitation larger than 0.025 mm may be computed, and denoted by frac. A sample weight w may be computed as follows:

$$w = w_{min} + (1 - (\text{frac} - 1)^a) * w_{max} - w_{min})$$

where $w_{min} = 0.02$ and $wm_a x = 0.4$ are the enforced minimum and maximum weights and the exponent a may be set to 4. The probability of each sample patch being selected into the training dataset is based on the computed weight w.

Ground Truth Observation Data for Training: The Multi-Radar Multi-Sensor (MRMS) System As discussed, numerical weather prediction (NWP) models often create forecasts from current weather condition inputs, including measurements or observations by ground radar, weather balloons, weather satellites, ocean buoys, and other similar instruments. Such ground-truth data are also the standards against which forecast results may be compared.

Figure 5:
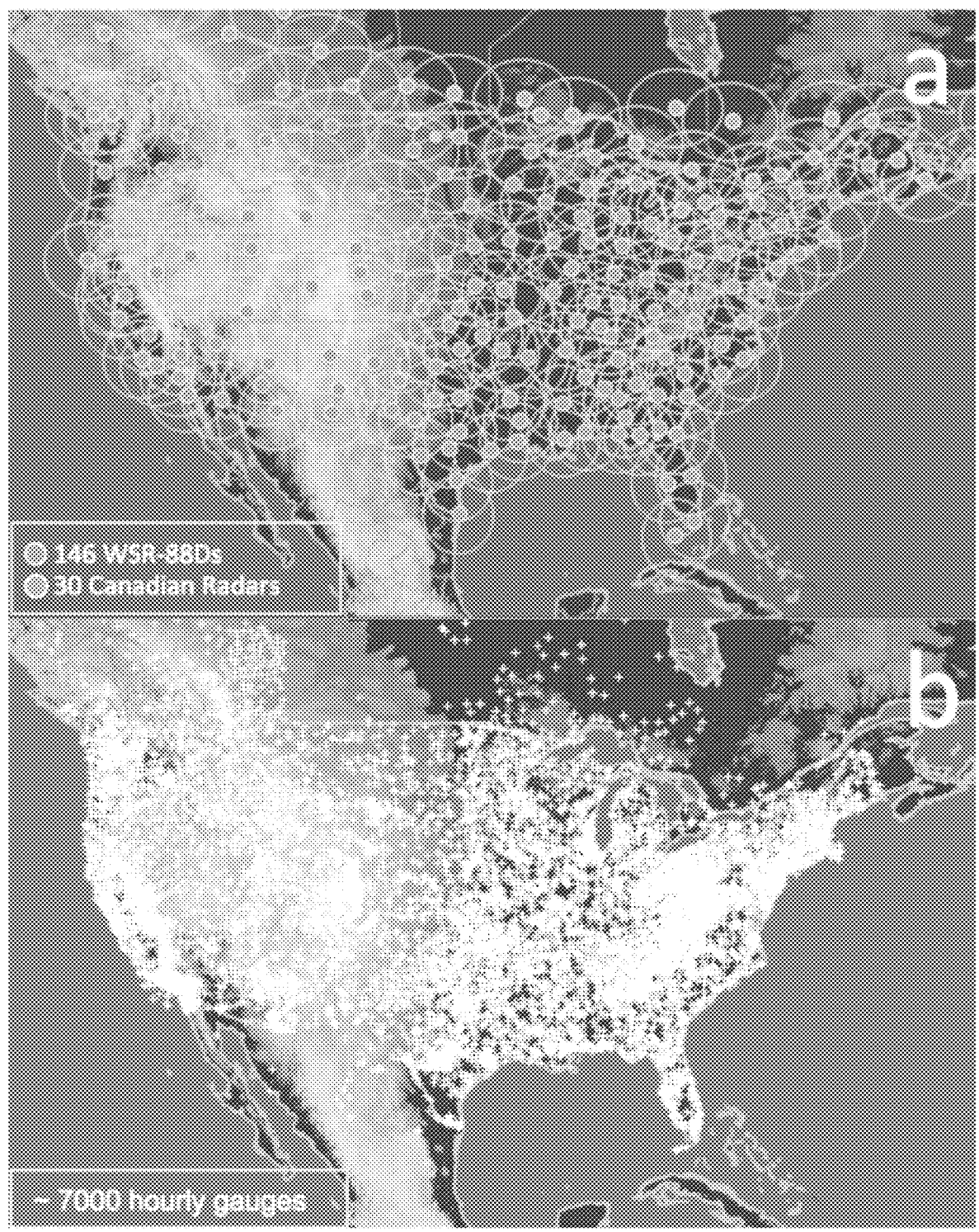
FIG. 5 is a map illustrating domain and locations of radar and rain gauge sites in the Multi-Radar Multi-Sensor (MRMS) system implemented at the United States National Centers for Environmental Prediction (NCEP).
Figure 6:
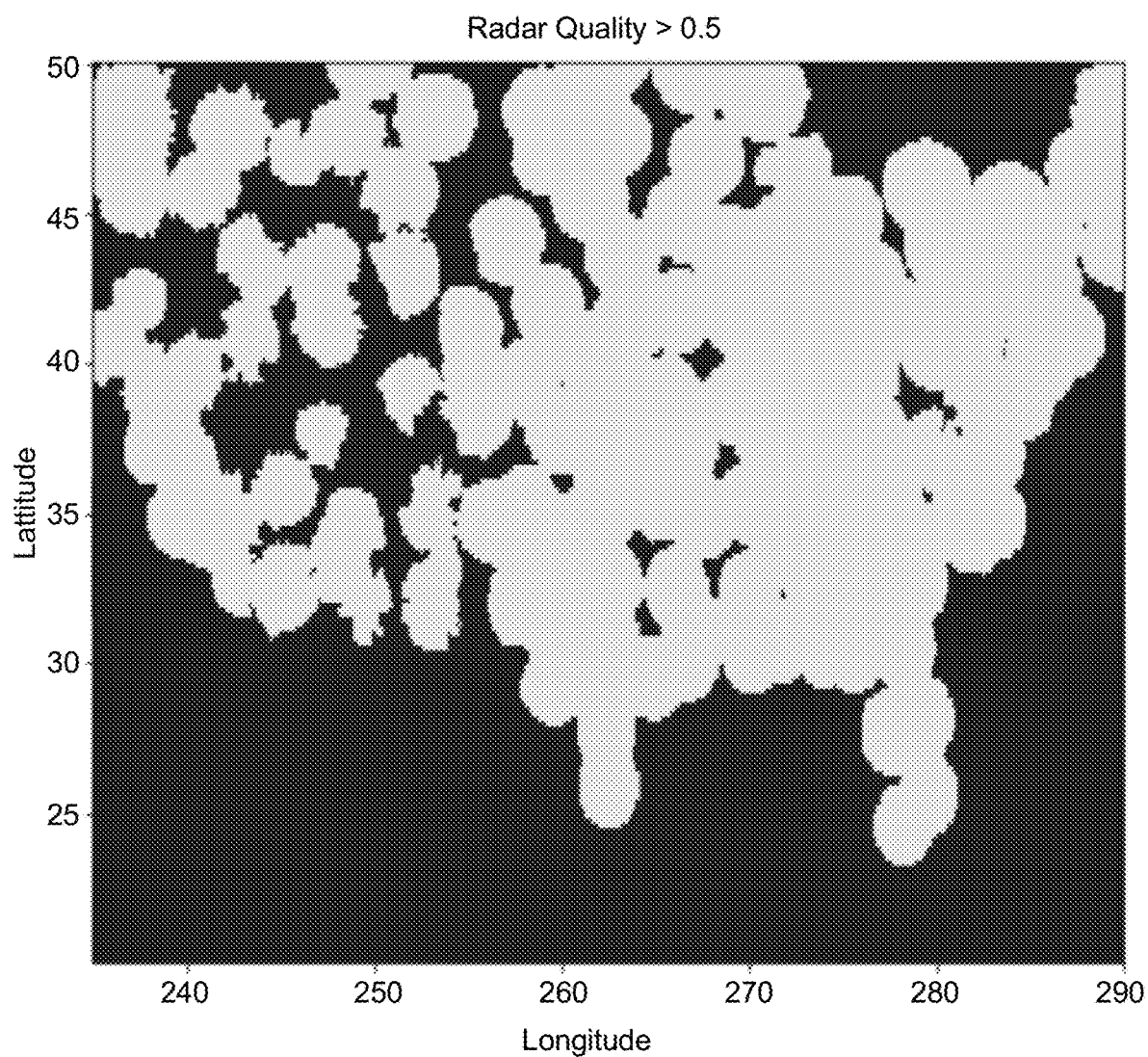
FIG. 6 shows an exemplary radar quality mask over United States, according to one embodiment of the present invention.

FIG. 5 is a map 500 illustrating domain and locations of (a) radar and (b) rain gauge sites in the Multi-Radar Multi-Sensor (MRMS) system implemented at the United States National Centers for Environmental Prediction (NCEP) (from Zhang et al., 2016, Multi-radar multi-sensor (MRMS) quantitative precipitation estimation: Initial operating capabilities. *Bulletin of the American Meteorological Society*, 97(4):621-638). As stated in Zhang et al., The MRMS conterminous U.S. domain covers an area with latitude bounds of 20° and 55° N and longitude bounds of 130° and 60° W. The MRMS grid has a horizontal resolution of 0.01° in both latitude and longitude directions, which is equivalent to about 1.11 km in the north-south direction throughout the domain. In the west-east direction, the grid resolution varies from about 1 km at the southern bound to about 0.6 km at the northern bound. In FIG. 5, dots on the top portion (a) indicate U.S. and Canadian radar sites, and the circles are 250-km range rings. Plus signs on the bottom portion (b) indicate locations of hourly gauges. MRMS currently integrates about 180 operational radars, to create a 3D radar mosaic across the conterminous United States and southern Canada at very high spatial (1 km) and temporal (2 min) resolutions For ground truth used in CLIMATEAI's CorrectorGAN model evaluation, the radar-only 6-hour (6h) quantitative precipitation estimates of MRMS may be downloaded from an archive provided by Iowa State University (see https://mtarchive.geol.iastate.edu/). Data originally is provided at 0.01 degree (0.0F) resolution, and may be regridded bi-linearly to 0.04° resolution to achieve a 4 km resolution.

To ensure informative model evaluation scores, evaluation is further restricted to patches in which at least 90% of pixels have a radar data quality of >0.5, with radar quality ranging from 0 to 1. FIG. 6 shows the coverage resulting from a >0.5 quality mask, according to some embodiments of the present invention.

Baseline Forecasts for Forecast Quality Comparison

In various embodiments of the present invention, different meaningful baselines may be used to determine forecast quality. A first exemplary "lower bound" baseline may be obtained by bi-linearly interpolating 10 ensemble members of the coarse-resolution global forecast TIGGE to 4 km. A second baseline may be defined using the High-Resolution Ensemble Forecast (HREF) system (Roberts et al., 2019, The high resolution ensemble forecast (href) system: Applications and performance for forecasting convective storms. Earth and Space Science Open Archive, page 1), an ensemble of storm-resolving regional forecast models run for the Continental United States. As discussed previously, an ensemble weather forecast is a set of forecasts representing the range of future weather possibilities, typically generated with slight variations in initial conditions and weather model perturbations that represent the inherent chaotic nature of the atmosphere and uncertainties in the initial conditions as well as the weather model approximations. An ensemble of weather forecasts represent a range of possible weather conditions and scenarios. Regional models such as HREF are run at high computation and labor costs, only possible for small or wealthy regions of the world, whereas forecasts generated by embodiments of the present invention are essentially free and can potentially be applied globally.

HREF combines 5 distinct forecast models, each with additional lagged member, i.e. using the forecast initialized 12 hours previously, making it a 10 member ensemble. The 5 distinct forecast models are called HRRR, HIRESW-ARW, HIRESW-CONUSNMMB, HIRESW-CONUSNSSL and NAM-CONUSNEST. These are 5 regional weather models run by several US weather services. They have higher resolution (around 3 km) compared to their global counterpart used as input data to the CorrectorGAN system (around 14 km). These regional models only cover the contiguous US and are expensive to run. HREF combines the individual forecasts to create a probabilistic ensemble forecast.

More specifically, HREF data may be downloaded from the server of the National Severe Storms Laboratory. Here the data is provided for each of the 5 models separately. For each, the 00 and 12UTC initialization times may be downloaded, and a 10-member ensemble is created by stacking the 5 original models in addition to a lagged forecast (i.e. the forecast initialized 12 h earlier) for each model. Note that this is slightly different from the operational HREF version which uses a 6 h lag for one of the models, the High-Resolution Rapid Refresh model (HRRR).

Pre-processing is necessary when combining the different models because precipitation is reported in different formats. Some models report total precipitation accumulation, e.g., the file for 12h forecast lead time contains the precipitation amount from 0 to 12h. To get the accumulation between 6-12h, the 6h values may be subtracted from the 12h values. Other models, however, report only one hour accumulations in each file. For these models all files from 7 to 12h may be downloaded and the values summed. Furthermore, some models sometimes use a two-hour accumulation instead of a one-hour accumulation. One difficulty during data pre-processing is that there is no clear documentation on which model has which style of reporting, and some models switch styles at random times throughout the year. For this reason, data retrieval and pre-processing engine 312 may implement multiple checks when downloading the baseline models to test which style of precipitation reporting is used. For example, tests may be performed to check whether the difference from one hour to the next is always positive, true if the total precipitation accumulation style was used. Similarly, to detect the time windows for the two-hour accumulation case, a check may be performed to see whether a given model's domain-averaged values are significantly (e.g., ×1.5 or more) greater than that of a reference model in which there is confidence, "nam_conusnest". To check whether data pre-processing or transformations are done correctly, numerous samples of the final HREF ensemble may be compared against the HREF Ensemble Viewer to confirm that they matched.

cGAN-Based Forecast Correction and Downscaling

Figure 7:
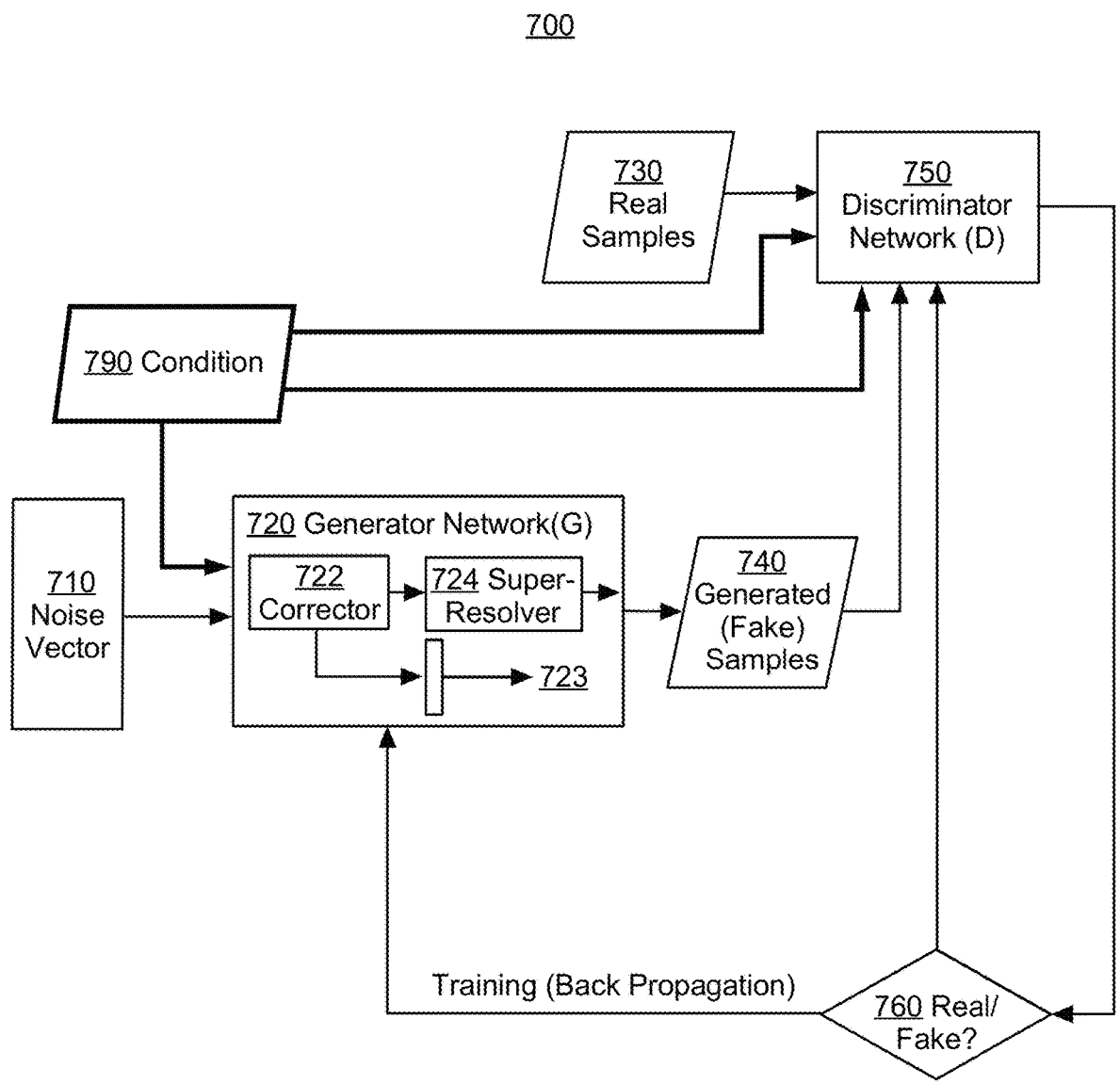
FIG. 7 shows an illustrative network diagram for an exemplary cGAN-based weather forecast correction and downscaling engine, according to some embodiments of the present invention.

FIG. 7 shows an illustrative network diagram 700 for an exemplary cGAN-based weather forecast correction and downscaling engine, such as 316 shown in FIG. 3. In this embodiment, the cGAN-based engine comprises a Generative Adversarial Network (GAN), a machine learning framework comprising two neural networks that compete in a zero-sum game: a generative or generator network 720 and a discriminative or discriminator network 750. Generator network 720 learns to generate high-quality data samples in an attempt to deceive discriminator network 750 and to maximize the probability that discriminator network 750 makes mistakes; discriminator network 750 learns to make the best possible distinction between real data samples 730 and generated or synthesized fake data sample 740. The generator network 720 is typically seeded with randomized input 710, and dynamically trained with the goal to fool discriminator 750, which itself is simultaneously trained to achieve a desired discriminative accuracy. Independent backpropagation procedures are applied to both networks to improve their generative and discriminative powers. Once trained, generator network 720 generates new data with the same statistics as the training set, which are high-resolution forecasts for the CorrectorGAN system.

A conditional GAN (cGAN) is a type of GAN that involves the conditioning on auxiliary input information 790, such as class labels for corresponding input data for generator network 720 and discriminator network 750, that enable the generation of data sets 740 of a given class or type. That is, given a label and random noise vector as input, the generator produces data with the same structure as training data corresponding to the same label. Thus the generator can learn to generate multi-modal data depending on the conditioning.

Embodiments of the CorrectorGAN system as illustrated in FIG. 3 are trained to generate an ensemble of plausible high-resolution meteorological predictions from low-resolution forecasts. For example, ensembles of high-resolution precipitation forecast data covering a time span T may be generated from a low-resolution input precipitation forecast data set covering the same time span, and having the same distribution as ground truth measurements.

In the CorrectorGAN system, conditional input information 790 are low-resolution precipitation forecasts and other variables as described with references to FIG. 4 from global weather forecast models. That is, conditioning variable or conditional input information 790 comprises multiple 2D scalar fields over geopatches of interest. Discriminator 750 is trained to determine whether or not a given high-resolution input such as 730 or 740 is a sample from the training dataset of high-resolution observations, and generator 720 is trained to generate realistic-looking and reliable artificial samples 740 having the same distribution as the training dataset 730, while both networks are conditioned on low-resolution forecasts 790. Generator network 720 in the CorrectorGAN system comprises a novel two-stage architecture, including a corrector network 722 and a super-resolver network 724. First, the coarse input forecast 790 is bias- or error-corrected via low-resolution output 723 of corrector 722, and mapped to a corrected distribution based on information about the weather situation. Then, this distribution is mapped via super-resolver 724 to a distribution of high-resolution, plausible predictions. Also disclosed in the following sections is a novel multi-stage training algorithm.

As described herein, embodiments of the present invention use one or more artificial intelligence (AI) and machine learning (ML) algorithms or modules within the aforementioned generative adversarial network model to downscale and increase the accuracy and resolution of weather and/or climate forecasts. Various exemplary ML algorithms are within the scope of the present invention, and the following description describes in detail, illustrative but non-limiting ML techniques for implementing various embodiments of the present invention.

Generator Network Architecture

Figure 8A:
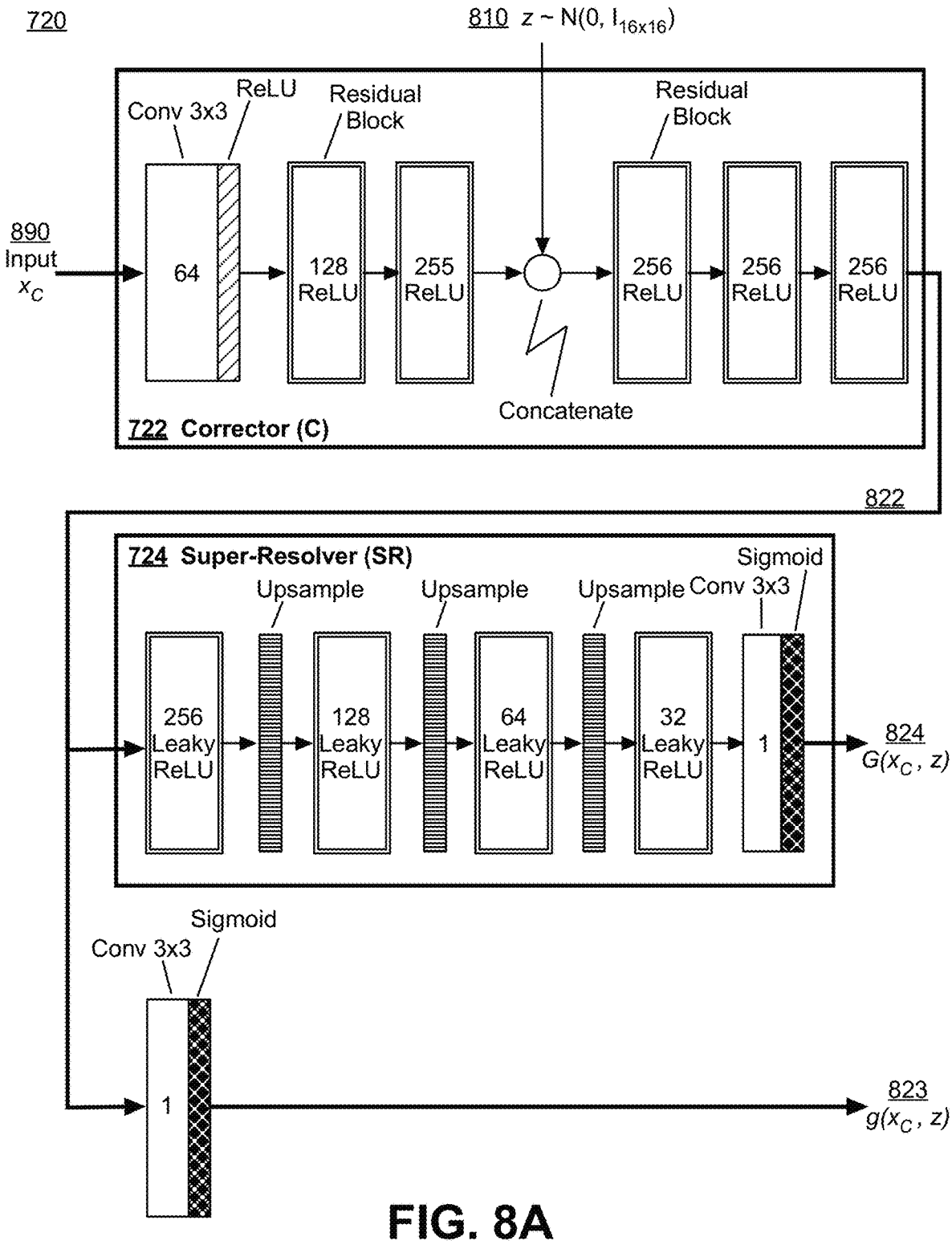
FIG. 8A shows an illustrative artificial neural network design of a generator network in a CorrectorGAN system, according to some embodiments of the present invention.

FIG. 8A shows an illustrative artificial neural network design of the generator network 720 in CLIMATEAI's CorrectorGAN system, according to some embodiments of the present invention. The labels on each internal block or layer show the number of output channels (or rows in the linear layer case), and their respective internal non-linearities if applicable.

This exemplary design is for illustration only and does not limit the scope of the generator network 720 to the particular neural network architecture and particular downscaling technique shown. Neural networks can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture and topology, or the specific arrangements of layers and nodes in the network. In some embodiments, the design of the neural network may also comprise determination or configuration techniques for pre-training the neural network and/or for initialization of hyperparameters and model coefficients.

In this illustrative example, generator 720 takes two inputs xc 890 and z 810, to generate two outputs g(xc, z) 823 and G(xc, z) 824. Input 890 and output 823 may have the same resolution, while output 824 may have a higher resolution.

To downscale precipitation forecasts, input xc 890 corresponds to the input conditional information 790 shown in FIG. 7, and input z 810 corresponds to noise vector 710. Generator 720 performs two distinct sub-tasks: first to correct errors in the input low-resolution precipitation forecasts 890, generating a more accurate distribution over low-resolution representations of the precipitation field, and second to refine the resolution of those corrected low-resolution forecasts to generate high-resolution output 824, which in turn corresponds to generated samples 740 shown in FIG. 7.

Broadly, the early stages of the network, corrector C 722, produce corrected, stochastic, low-resolution representations 822 of the precipitation field from random noise vectors 810 conditioned on input 890, which may comprise an ensemble of forecasts of precipitation and other weather variables, plus some surrounding spatial context, as discussed with reference to FIG. 4. The second stage of the network, super-resolver (SR) 724, refines the resolution of these corrected representations 822 into physically and visually plausible high-resolution forecasts 824.

Figure 8B:
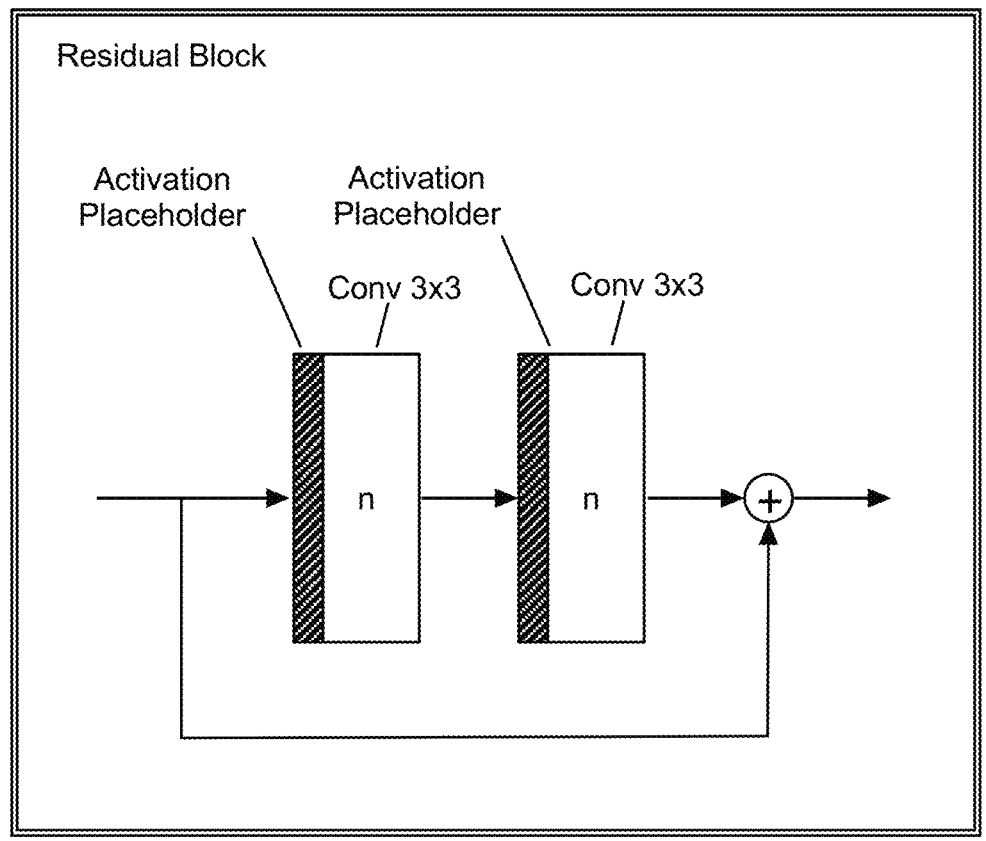
FIG. 8B shows an illustrative residual block, according to some embodiments of the present invention.

In this exemplary embodiment, corrector 722 shown in FIG. 8A may consist of a 3×3 convolutional layer followed by 2 residual blocks, with output channels numbering 64, 128, 255, respectively, and with ReLU activations. An exemplary network structure 850 for the residual blocks is shown in FIG. 8B, according to some embodiments of the present invention. Noise sample input z 810 may have the distribution $z \sim N(0, I_{16 \times 16})$ for each input and may be concatenated to the output of the second residual block as the 256th channel. The forward pass continues with three more residual blocks, all with 256 output channels and ReLU activations. Output 822 of the final of these residual blocks is then fed into super-resolver 724, but is also fed into a convolutional layer with a single output channel, with output 823 denoted as g(xc, z). Output 823 may be used as a proxy corrected low-resolution forecast, the error of which may be jointly minimized during optimization along with the GAN loss and other regularizers.

Furthermore, in this exemplary embodiment, super-resolver 724 shown in FIG. 8A may consist of 4 residual blocks with output channels numbering 256, 128, 64, and 32 respectively, and leaky-ReLU activations, interspersed by 3 bi-linear upsampling blocks. Super-resolver 724 increases the resolution of corrector output 822 from 16×16 to 128×128, before passing it through a convolutional layer with 1 output channel, and finally through a sigmoid activation, to produce high-resolution prediction 824, denoted as G(xc, z).

Discriminator Network Architecture

Figure 9:
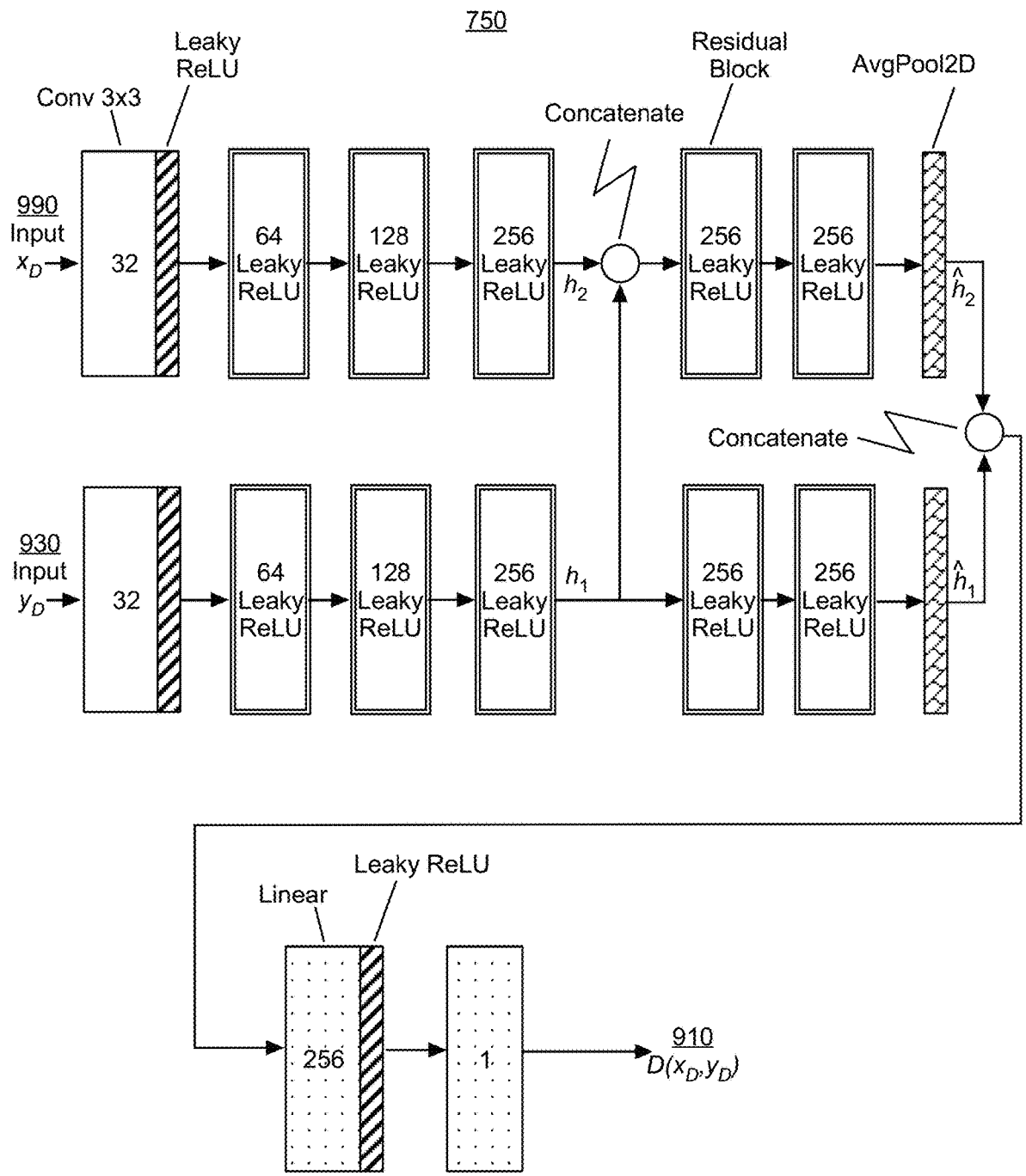
FIG. 9 shows an illustrative artificial neural network design of a discriminator network in a CorrectorGAN system, according to some embodiments of the present invention.

FIG. 9 shows an illustrative artificial neural network design of the discriminator network 750 in CLIMATEAI's CorrectorGAN system, according to some embodiments of the present invention. This exemplary design is for illustration only and does not limit the scope of the discriminator network 750 to the particular neural network architecture and particular downscaling technique shown.

Discriminator 750 takes as input a pair of low-resolution input $x_D$ 990 and high-resolution input $y_D$ 930, and determines whether or not this pair ($x_D$, $y_D$) has originated from the training set of (low-resolution forecast, high-resolution observation). That is, for precipitation forecasting, discriminator 750 evaluates whether a given high-resolution precipitation field $y_D$ 930 appears plausible in its own right, and additionally whether it corresponds to the ground truth, given a set of low-resolution forecasts and context $x_D$ 990. Again, input $x_D$ 990 corresponds to the input conditional information 790 shown in FIG. 7. On the other hand, input $y_D$ 930 may correspond to either high-resolution observation 730 in FIG. 7, or generated samples 740 in FIGS. 7 and 824 in FIG. 8A.

More specifically, high-resolution input 930 and global model low-resolution forecasts 990 are first processed independently, each through a convolutional layer followed by three residual blocks, with 32, 64, 128, and 256 output channels respectively, producing intermediate representations $h_1$ and $h_2$. A stride of 2 may be used in residual blocks processing the high-resolution input, so that $h_1, h_2 \in R^{256 \times 16 \times 16}$. Next, $h_1$ and $h_2$ are concatenated along the channel dimension, and further processed by residual blocks with 256 output channels, the output of which undergoes average pooling, resulting in a vector $\hat{h}_2 \in R^{256}$. $h_1$ is further processed independently by another residual block with 256 output channels and average-pooled to produce $\hat{h}_1 \in R^{256}$. $\hat{h}_2$ and $\hat{h}_1$ are then concatenated, and passed through a linear layer of width 256, a leakyReLU activation, and a final linear layer with a scalar output D($x_D$, $y_D$) 910.

Training and Loss Functions

Informed by the dual objectives of stochastic forecast correction and super-resolution, a multi-stage training procedure 1030 may be carried out by training engine 314 in FIG. 3, to optimize low-resolution forecast and downscaling errors by CorrectorGAN engine 316. In the following exemplary embodiment, a 3-stage training process is carried out.

Training the CorrectorGAN Engine

Figure 10:
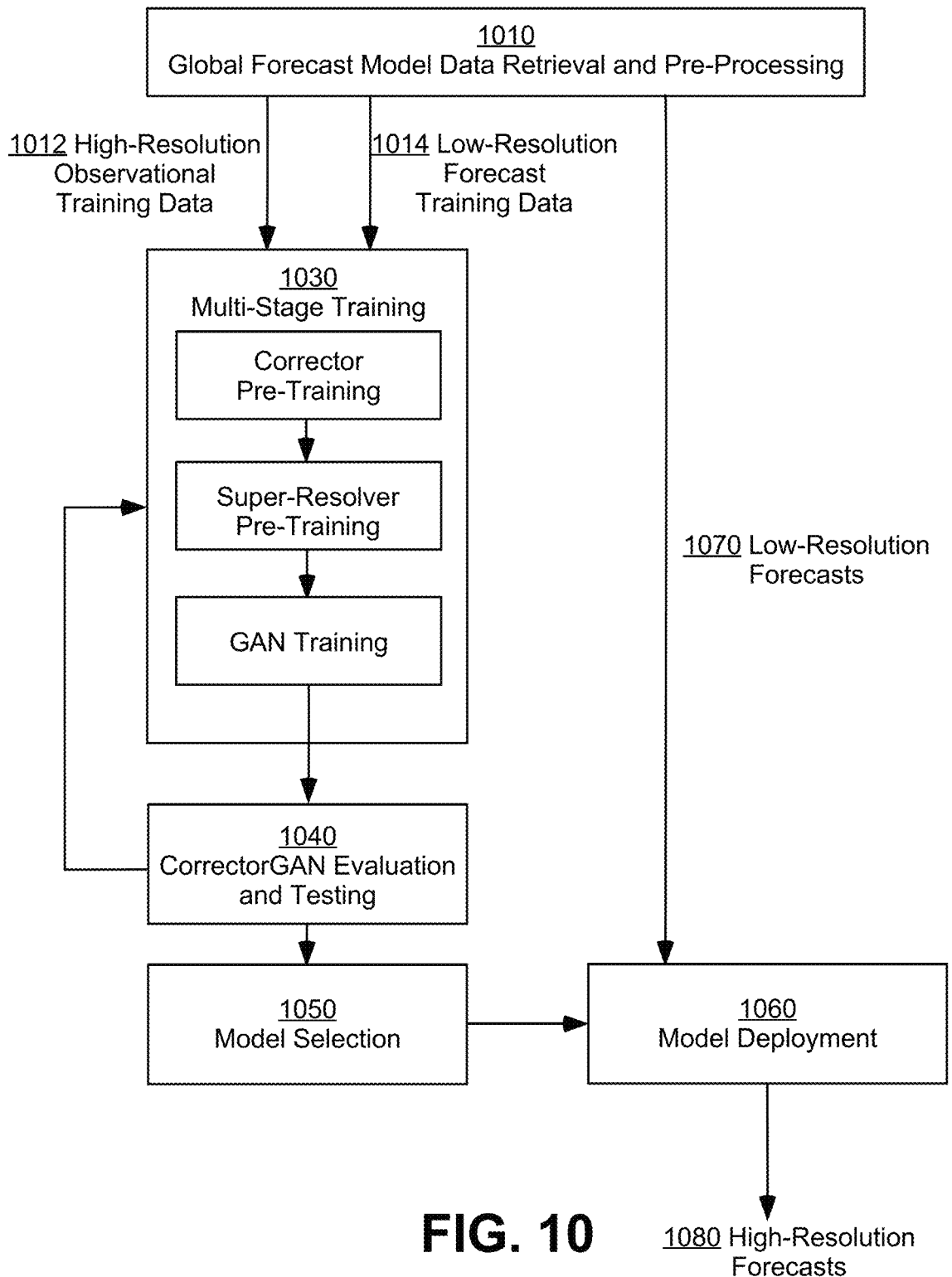
FIG. 10 shows an exemplary flow diagram for training an exemplary cGAN-based weather forecast correction and downscaling engine, according to exemplary embodiments of the present invention.

FIG. 10 shows an exemplary flow diagram 1000 for training the CorrectorGAN engine 316 for low resolution forecast correction and downscaling, according to exemplary embodiments of the present invention.

After being pre-processed by data retrieval and pre-processing engine 312 in a step 1010, corresponding (low-resolution forecast, high-resolution observation) pairs 1014 and 1012 may be sent to training engine 314 and three training stages 1030 may be carried out: corrector pre-training, super-resolver pre-training, and GAN training. During corrector pre-training, a low-resolution corrector output generated from low-resolution forecast input 1014 is compared to a down-sampled version of a corresponding high-resolution observation 1012. During super-resolver pre-training, a high-resolution super-resolver output is additionally compared to a corresponding high-resolution observation. During GAN training, generator error and discriminator error are minimized jointly.

At step 1040, CorrectorGAN model 316 may be evaluated, validated, and tested, and further refinements may be fed back into step 1030 for additional training. Once its performance is acceptable, at step 1050, optimal model parameters may be selected, for deployment at step 1060. New low-resolution forecast data 1070 may be used by the deployed model to generate high-resolution forecasts 1080.

Again, training data are documented datasets containing multiple instances of low resolution forecasts (e.g., TIGGE ensemble forecasts and contexts as discussed with reference to FIG. 4) and corresponding high-resolution forecasts (e.g., corresponding MRMS data). "Low-resolution" and "high-resolution" are relative, with CorrectorGAN output having a spatial resolution or spatial-temporal resolution higher than corresponding inputs. For the neural network (NN)-based machine learning model CorrectorGAN 316, the quality of its performance depend on (a) NN architecture design and hyperparameter configurations, (b) NN coefficient or parameter optimization, and (c) quality of the training data set. These components are refined and optimized during training.

As discussed previously, the CorrectorGAN system models the true underlying distribution of a target meteorological (e.g., precipitation) field at a given time over a given geopatch as a conditional distribution. Paris of (low-resolution precipitation forecast, high-resolution precipitation observation) may be denoted as $(x_i, y_i)$, where i indexes geopatch-time pairs, and $y_i$ has a true probability distribution $P_i$ over precipitation fields at geopatch-time i. The CorrectorGAN system models $P_i$ as a conditional distribution $P(y|x_i)$, and learns to approximate this conditional distribution using the cGAN disclosed herein, enabling the sampling of any number k of high-resolution forecasts $\{\hat{y}_i^1, \ldots, \hat{y}_i^k\}$. In various embodiments, geopatch-time pairs may be indexed over appropriate tuples representing geographical location and time instances.

Furthermore, during training, all (low-resolution precipitation forecast, high-resolution precipitation observation), or $(x_i, y_i)$ pairs may be pre-processed by first going through a zero-preserving log transform, then shifted and scaled to lie in [0,1]. However, evaluation maybe performed on the raw data absent normalization and transformation.

Stage 1 Low-Resolution Correction Pre-Training of the Corrector Block in the Generator Network First, corrector block 722 shown in FIG. 8A may be trained to improve the accuracy and skill of input low-resolution forecasts. Specifically, training may be carried out with noise input z 710 set to 0 to minimize the following loss function:

$$L_{Stage1} = \|g(x,0) - y_{coarse} \odot (y_{coarse}+1)\|_1 - y_0 \widetilde{FSS}(g(x,0), y_{coarse}),$$

where y is high-resolution ground truth (e.g., 128×128 grid of MRMS observation data at 4 km resolution for a geopatch of size 512 km×512 km), $y_{coarse}$ is y downsampled by a factor of 8 (e.g., 16×16 grid at 32 km resolution over the same geopatch), and $\widetilde{FSS}$ is an approximation of the Fractions Skill Score, an established spatial verification metric for precipitation forecasts, where a binary grid is replaced by a continuous, sigmoid approximation. The Hadamard product $\odot$ in machine learning refers to component-wise multiplication for matrices.

As shown in FIG. 8A, when z=0, g(x,0) is the deterministic, activated output 840 of corrector 722 generated from low-resolution forecast input x, without any added perturbations. This pre-training stage compares the low-resolution forecast x with corresponding down-sampled ground truth observation $y_{coarse}$ to correct the low-resolution x according to learned patterns.

In the first L1 distance term, a weighting scheme with weighting function $y_{coarse}+1$ is used to focus more on areas with higher precipitation, where $y_{coarse}$ has been pre-processed and normalized into the interval [0,1].

Fractions Skill Score (FSS) is a deterministic metric for forecast accuracy which, unlike pixel-wise metrics like Root-mean-square-error (RMSE) and Mean absolute error (MAE), avoids over-penalizing small spatial shifts. That is, when comparing an estimated precipitation field to a map of the actual precipitation, relying on RMSE or MAE across all pixels to measure image similarities can easily lead to a double counting problem: if heavy precipitation occurs at one pixel location in the image but is predicated to occur at a neighboring pixel location instead, then the small spatial shift is counted as a double error during RMSE calculation. FSS mitigates this problem by neighborhood averaging, where a filter is applied to the precipitation field so that neighboring pixel locations within a window are weighted during the comparison of precipitation forecasts to ground truth data.

FSS is defined under two parameters: a threshold, and a window size. For a given threshold, and a given window size, let $M_i$ be the fraction of pixels in window i forecast to exceed the threshold, and let $O_i$ be the fraction of observations in window i exceeding the threshold, then FSS is defined as follows:

$$FSS = 1 - \frac{\sum_i (O_i - M_i)^2}{\sum_i O_i^2 + \sum_i M_i^2}.$$

In the $L_{Stage1}$ calculation above, a continuous approximation $\widetilde{FSS}$ is used as a learning signal to encourage skillful low-resolution corrected forecasts. Specifically, instead of calculating $M_i$ and $O_i$ as the averages of binary masks $1_{y_t > c}$ over a given window for a threshold c, $M_i$ and $O_i$ are calculated as the averages of $\phi(10(y_i-c))$ for predictions and observations respectively, where $\phi$ is the sigmoid function. In some embodiments, a threshold value of c=0.5 may be used, with pre-processed data lying in [0,1]. In addition, the $\widehat{FSS}$ term may be weighted by a coefficient $\gamma_0$. For example, $\gamma_0$ may be set to 0.1 in one embodiment of the present invention. Other values are also possible. In this exemplary embodiment, the use of FSS is motivated by the small-scale nature of precipitation. When CorrectorGAN is employed for predicting another meteorological variable such as temperature, coefficient $\gamma_0$ may be set to smaller values or even to zero.

On a high level, minimizing the loss $L_{Stage1}$ trains Corrector 722 to correct for errors in spatial distribution, based on the patterns identified across its multiple ensemble forecast inputs together with the additional contextual variables. That is, this pre-training Stage 1 trains only a portion of generator 720 in FIG. 8A to encourage that generator 720 to learn low-resolution correction first, before introducing the super-resolution task.

Stage 2 High Resolution Pre-Training of the Super-Resolver Block in the Generator Network Next, generator 720 may be further trained by adding an L1 loss on the high-resolution output 740, as pre-training for super-resolver block 724. This may be done with noise z=0, and maintaining the low-resolution L1 error term, but dropping the $\widehat{FSS}$ term, resulting in $$L_{Stage2}=\|g(x,0)-y_{coarse}\odot(y_{coarse}+1)\|_1+\|G(x,0)-y\odot(y+1)\|_1$$

Stage 3 GAN Training

Finally, the full cGAN 700 may be trained to solve the following optimization problem:

$$\min_{\theta_D}\mathbb{E}_{x,y,z}[L_D(x, y, z, \theta_D)],$$

$$\min_{\theta_G}\mathbb{E}_{x,z}[L_G(x, z, \theta_G)],$$

where $L_D$ and $L_G$ are the loss functions defined for discriminator (D) 750 and generator (G) 720 respectively, and $\theta(\cdot)$ are the respective network parameters. Standard GAN loss functions such as the Wasserstein loss may be used with gradient penalty for discriminator 750:

$$L_D=D(x,G(x,z))-D(x,y)+\lambda(\|\Delta_{\tilde{y}}D(x,\tilde{y})\|_2-1)^2$$

where D(x, G(x,z)) refers to discriminator output 910 during training, and $$\tilde{y}=\epsilon y+(1-\epsilon)G(x,z), \epsilon\sim U(0,1).$$

For generator 720, a Wasserstein loss may be used with two additional loss terms $L_{LR}$ and $L_{HR}$:

$$L_G=\mathbb{E}_{x,y}[\mathbb{E}_z[-D(x,G(x,z))]+\gamma_1 L_{LR}+\gamma_2 L_{HR}].$$

The additional loss terms may be defined as follows:

$$L_{LR}=\|(\mathbb{E}_z[g(x,z)]-y_{coarse})\odot(y_{coarse}+1)\|_1,$$

$$L_{HR}=\|(\mathbb{E}_z[G(x,z)]-y)\odot(y+1)\|_1.$$

These additional loss terms are similar to those used in the first pre-training stage, and similarly encourage spatial overlap and intensity similarity of the corrected proxy low-resolution prediction and the high-resolution output with their corresponding ground truths. However, to model a distribution of possible precipitation fields, the mean or expected value $\mathbb{E}_z$ of an ensemble of predictions generated over random variable z is compared with the ground truth, rather than looking at the error of each ensemble member.

Training Hyperparameters

In the three aforementioned training stages, any appropriate optimization algorithm may be used. For example, the Adam Optimization Algorithm (hereinafter, "Adam") may be deployed. Adam is an algorithm for first-order gradient-based optimization of stochastic objective functions, based on adaptive estimates of lower-order moment. It is an optimization solver that leverages the power of adaptive learning rates methods, designed specifically for training deep neural networks, with high computational efficiency and low memory requirements.

In an illustrative example, training is done on 4 NVIDIA Tesla T4 GPUs using mixed precision, with the following parameters:

Stage 1: Adam is used with learning rate 5e-05, $\beta_1=0$ and $\beta_2=0.9$, and train for 5 epochs, with batch size 128;

Stage 2: Adam is used with learning rate 5e-05, $\beta_1=0$ and $\beta_2=0.9$, and train for 7 epochs, with batch size 128;

Stage 3: Adam is used with learning rate 5e-05, $\beta_1=0$ and $\beta_2=0.9$, for both generator 720 and discriminator 750, and train for 35 epochs, with batch size 256 and select the final model based on validation Continuous Ranked Probability Score (CRPS). The following parameters are set: $\gamma_1=20$, $\gamma_2=20$, $\lambda=10$, and 6 ensemble members are used when computing the expectation in the $L_{LR}$ and $L_{HR}$ loss terms. The discriminator is trained for 5 steps for every 1 training step of the generator.

Exemplary Embodiment

FIG. 11 is an exemplary flow diagram 1100 for a process to train an exemplary cGAN-based weather forecast correction and downscaling engine, according to some embodiments of the present invention. More specifically, process steps are presented for training a generative adversarial network (GAN) for correcting and downscaling global numerical weather forecast data to generate an ensemble of forecast data for a target meteorological variable at a target spatial resolution.

Upon initialization at step 1105, global numerical weather forecast data are pre-processed at step 1110 to generate an ensemble of corrector input data at a first spatial resolution, wherein (1) the first spatial resolution is lower than a target spatial resolution, (2) the generative adversarial network (GAN) comprises a generator deep neural network (G-DNN) and a discriminator deep neural network (D-DNN), (3) the G-DNN comprises a corrector deep neural network (C-DNN) followed by a super-resolver deep neural network (SR-DNN) having an output spatial resolution at the target spatial resolution, and (4) the generated ensemble of corrector input data comprises data for a target meteorological variable and at least one context meteorological variable different from the target meteorological variable. In some embodiments, the input to and output from the C-DNN both have the first spatial resolution. In some embodiments, the input to the SR-DNN has the first spatial resolution as well.

At step 1120, observational data for the target meteorological variable is down-sampled from a second spatial resolution to the first spatial resolution, wherein the second spatial resolution is higher than the first spatial resolution, and wherein the observational data corresponds to the ensemble of corrector input data over geopatch-time indices.

At step 1130, the C-DNN is trained, using a first loss function computed based on a first C-DNN output generated from the ensemble of corrector input, and the down-sampled observational data.

At step 1140, the SR-DNN is trained, using a second loss function computed based on the first C-DNN output, the down-sampled observational data, a first SR-DNN output generated from the first C-DNN output, and the observational data for the target meteorological variable.

At step 1150, the overall GAN is trained, using at least a third loss function computed based on a second C-DNN output generated from the ensemble of corrector input and a random vector input. The process terminates at step 1160.

Evaluation Metrics

Evaluating probabilistic precipitation forecasts is non-trivial, for at least two reasons: first, forecast distributions tend to be highly non-Gaussian and intermittent; second, different end users might be interested in only a certain aspect of a forecast, e.g. only extreme precipitation. Thus, no single metric captures the full spectrum of forecast skills.

Embodiments of the present invention utilize a set of evaluation metrics, assuming a good probabilistic forecast should be reliable and sharp. Reliability is a key property requiring the forecast distribution to be, in a statistical average, a true representation of the actual forecast uncertainty. For example, considering all cases in which rain was forecast with 30% probability, rain should have actually occurred in 30% of these cases (see Reliability Diagram below). Moreover, reliability alone may be insufficient in some forecast applications. For example, simply predicting the climatological average is a very reliable but not very useful forecast. A useful forecast also has to be sharp, that is, its distribution should be as narrow as possible while still being reliable. Embodiments of the present invention test jointly for reliability and sharpness using the Brier Score and the Continuous Ranked Probability Score (CRPS).

Reliability Diagram

Reliability diagrams plot the conditional distribution of the observations given the forecast probability, against the forecast probability of binarized precipitation events. To binarize the forecasts, precipitation thresholds may be used, for example, 1 mm for "light rain", 5 mm for "moderate rain", and 10 mm for "heavy rain". Forecast probability may be estimated from forecast ensemble members. To compute the conditional distribution, first the range [0,1] may be divided into bins of width 0.2; next, out of all instances where the event probability fell in a given bin, the proportion of instances where the event actually occurred is determined. A forecast that lies on the y=x line may be considered perfectly reliable.

Brier Score

The Brier Score works on thresholded forecast fields and is defined as $$BS = \frac{1}{n}\sum_{k=1}^{n}(y_k - o_k)^2$$

where $y_k$ is the event probability, ok is the corresponding binary observation, either 0 or 1, and n is the number of samples. In some embodiments, n ranges over all pixels for all forecast times in the test set. Lower scores are better.

Continuous Ranked Probability Score (CRPS)

The CRPS is equivalent to an integral of the Brier Score over all thresholds and is defined, for a single point, as $$CRPS = \int_{-\infty}^{\infty}[F(y)-F_o(y)]^2 dy,$$

where F(y) is the prediction/forecast CDF of the predictand y, and, $$F_o(y) = \begin{cases} 0 & y < \text{observed value} \\ 1 & y \geq \text{observed value} \end{cases}.$$

F(y) may be approximated using the ensemble of forecasts generated by a given model.

Exemplary Results for Forecast Correction and Downscaling with CorrectorGAN

In this section, results from an illustrative example of the CorrectorGAN forecast correction and downscaling system are compared to baseline datasets. In this particular example and as discussed in the data pre-processing section with reference to data retrieval and pre-processing engine 312, a first lower bound baseline may be obtained by bi-linearly interpolating 10 ensemble members of the coarse-resolution (32 km×32 km) global forecast TIGGE to the target higher-resolution (4 km×km), with a downscaling or upsampling rate of 8×. A second baseline may be defined using the High-Resolution Ensemble Forecast (HREF) system, which combines individual forecasts from multiple regional weather models into a probabilistic ensemble forecast also having 10 ensemble members. Both TIGGE and HREF data are pre-processed by engine 312 into having 6-hour lead times for forecasting. Furthermore, in this example, CorrectorGAN system is evaluated using an ensemble of 10 predictions as well, for fair comparison with the baseline data. In other cases, it is possible to create as large an ensemble as desired by a target forecasting application.

In this illustrative example, input data resolution is at 0.32 degrees (i.e., 32 km approximately). Output data resolution is at 0.04 degrees (i.e., 4 km approximately). The geographical area considered is contiguous US defined as 20N to 50N, −125E to −70E. The training time for CorrectorGAN is approximately one day using 4 NVIDIA Tesla T4 GPUs, while during deployment, inference time is less than 1 sec using 1 NVIDIA Tesla T4 GPU. The computing device used for training and deployment is a Google Cloud Virtual Machine, n1-standard-16, with 16 CPUs and 60 GB RAM.

In different embodiments of the present invention, the initial coarse resolution, the target high resolution, and the forecast lead time may be configurable system parameters. Input data may be pre-processed by engine 312 according to the coarse resolution and forecast lead time, while the cGAN-based CorrectorGAN engine 316 may be setup and trained to provide a desired downscaling or upsampling rate such as 2×, 4×, 16×, and the like.

Table 1 below compares the key probabilistic evaluation metrics for CorrectorGAN, HREF baseline and TIGGE Interpolation baseline. CorrectorGAN outperforms the interpolated TIGGE baseline for the Continuous Ranked Probability Score (CRPS) as well as the Brier Score at all chosen thresholds. HREF tends to be slightly better than CorrectorGAN. For the CRPS and the 1 mm Brier Score, CorrectorGAN is substantially closer to HREF than TIGGE, while for larger thresholds the differences in the Brier Score between the models are quite small.

TABLE 1

| | Probabilistic metrics | | | |
|---|---|---|---|---|
| | | Brier Score | | |
| Model | CRPS | 1 mm | 5 mm | 10 mm |
| CorrectorGAN | 0.574 | 0.06 | 0.034 | 0.02 |

TABLE 1-continued

Probabilistic metrics

| Model | CRPS | Brier Score | | |
| --- | --- | --- | --- | --- |
| | | 1 mm | 5 mm | 10 mm |
| HREF | 0.562 | 0.059 | 0.032 | 0.019 |
| TIGGE Interpolation | 0.605 | 0.064 | 0.035 | 0.021 |

Figure 12:
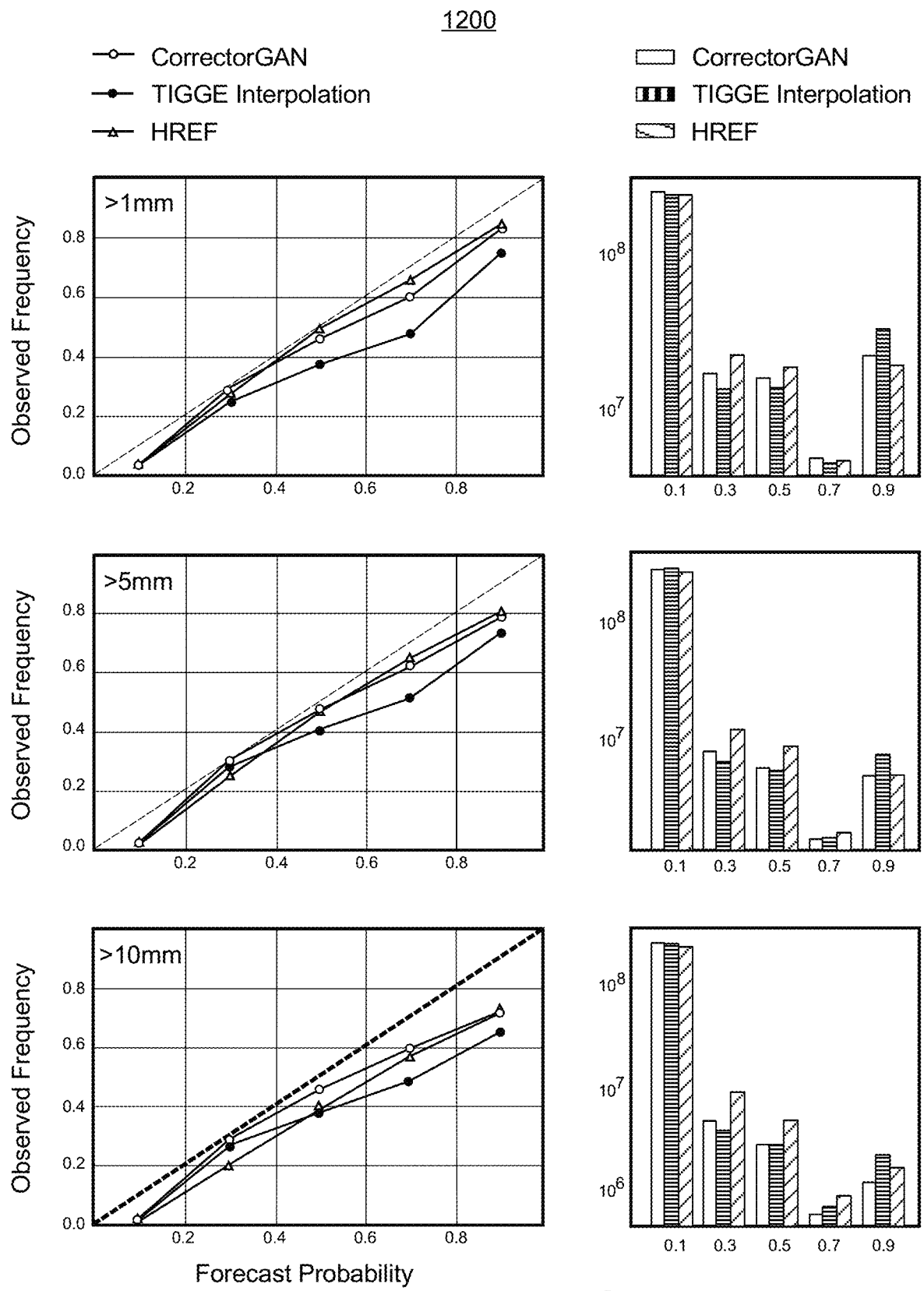
FIG. 12 shows reliability diagrams for exemplary CorrectorGAN, HREF and TIGGE Interpolation models, at different precipitation thresholds, according to some embodiments of the present invention.

FIG. 12 shows exemplary reliability diagrams 1200 for CorrectorGAN, HREF and TIGGE Interpolation models, for 1 mm, 5 mm, and 10 mm precipitation thresholds, according to some embodiments of the present invention. Plotted on the left are conditional distributions of the observations given the forecast probability, against the forecast probability of binarized precipitation events. The bar charts to the right show the number of predictions in each bin for each method on a log scale.

For the 1 mm and 5 mm reliability diagrams, and much of the 10 mm reliability diagram, HREF is much closer to the diagonal than TIGGE, indicating a more reliable forecast. TIGGE shows a slightly flatter slope which is a sign of an overconfident forecast, i.e. a forecast that does not have enough variance given its average forecast error. This is confirmed by other metrics such as the exemplary rank histogram 1300 shown in FIG. 13. CorrectorGAN manages to correct the forecasts to be much more reliable, achieving very similar results to HREF, and even providing a generally more reliable forecast given a 10 mm threshold, i.e. for extreme precipitation.

Figure 13:
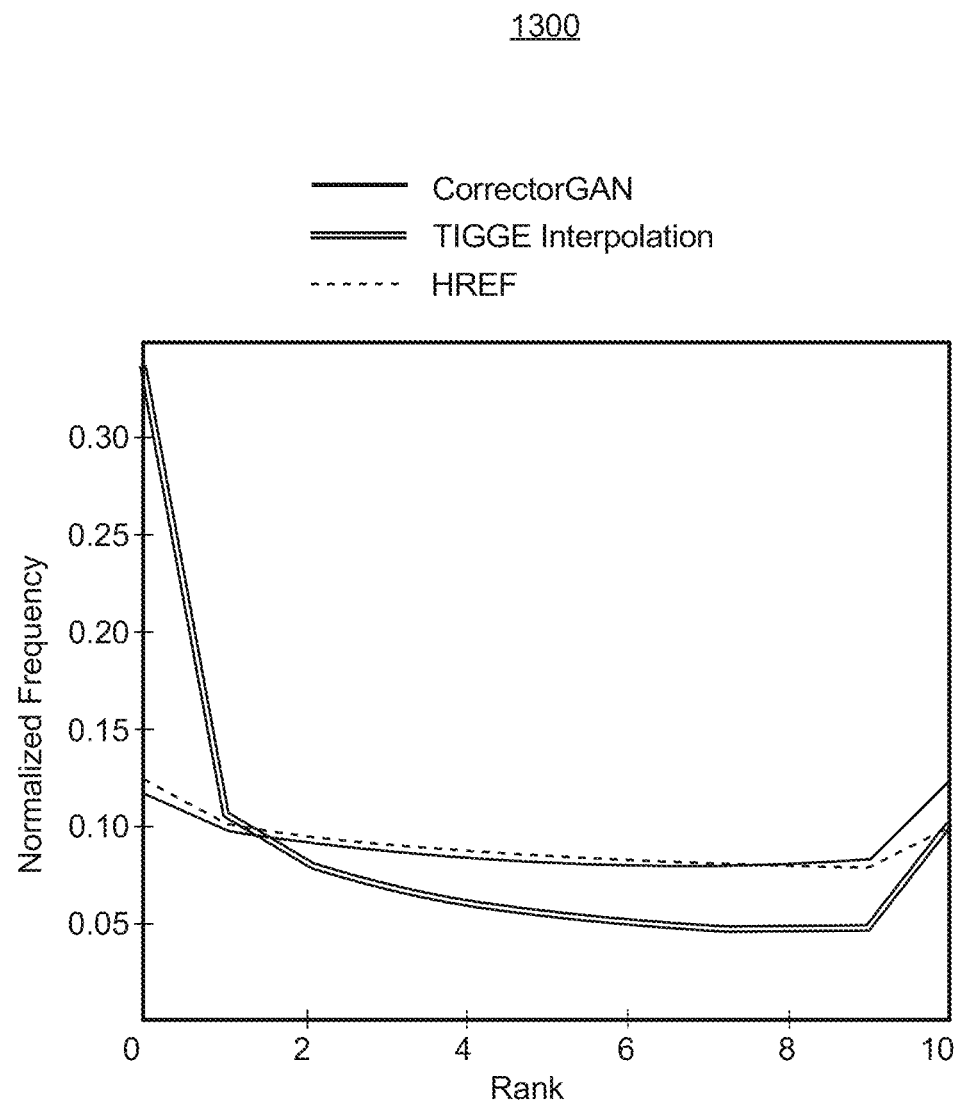
FIG. 13 shows an exemplary rank histogram, according to some embodiments of the present invention.

FIG. 13 shows an exemplary rank histogram 1300 of CorrectorGAN, HREF and the TIGGE interpolation, according to some embodiments of the present invention. One approach for evaluating whether an ensemble forecast fulfills the consistency desideratum (i.e., whether observations $y_i$ behave like random draws from the generated forecast distribution) is to construct a rank histogram. For each pixel in the entire test set, the rank (index) of the observed value is recorded when inserted into a sorted list of forecast ensemble members, and then a histogram of these ranks is plotted. A perfectly consistent forecast would result in a uniform (flat) histogram.

In FIG. 13, both CorrectorGAN and HREF exhibit much flatter rank histograms than the TIGGE interpolation, which exhibits a well-known problem of global, coarse forecasts sometimes known as a "drizzle bias": too often it predicts rain when there is none. The slightly larger peak by CorrectorGAN over HREF on the far right indicates that there may be some instances of heavy rainfall which are not predicted in the right pixels by the GAN, which may be better localized by HREF.

Figure 14:
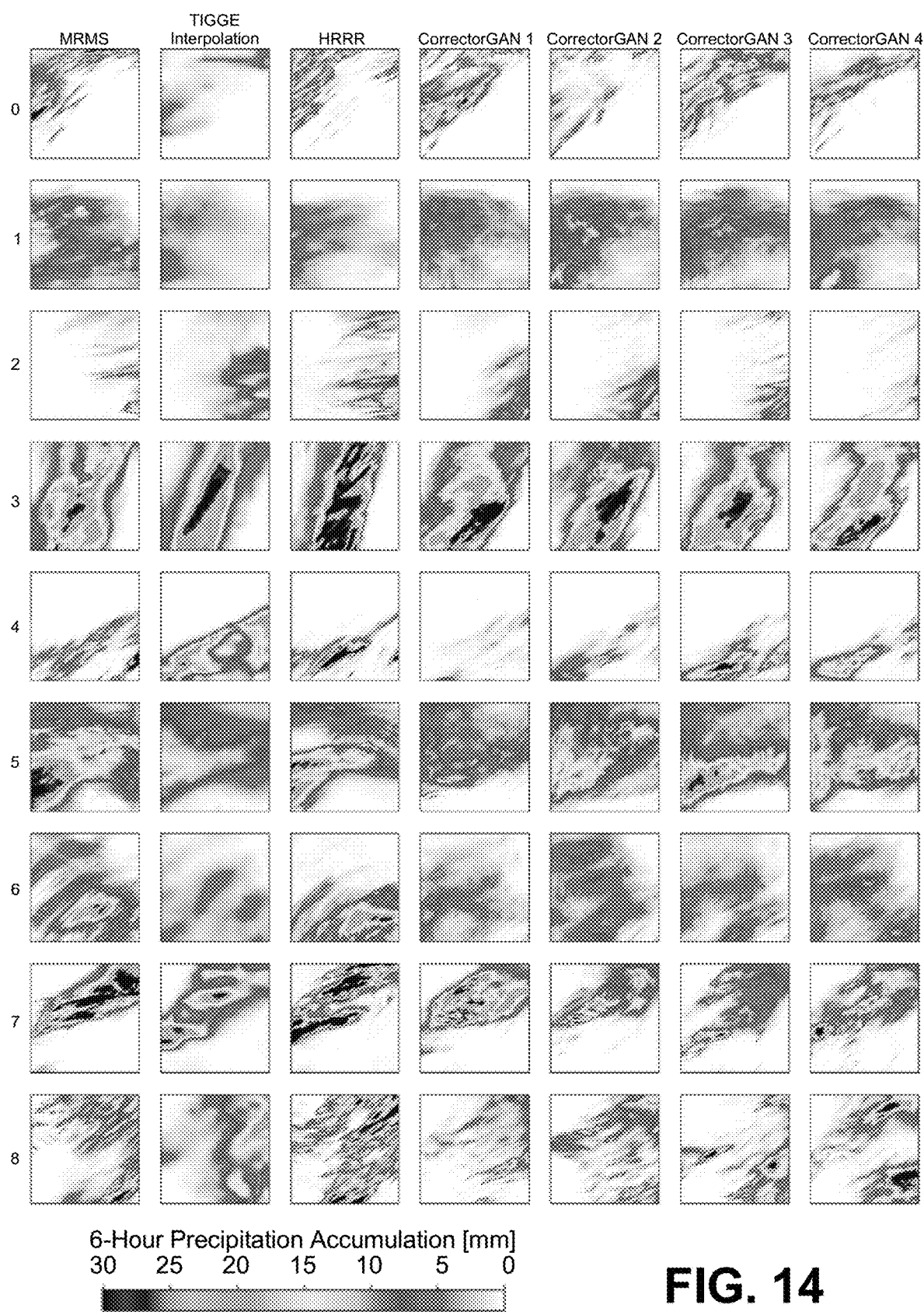
FIG. 14 shows sample forecasts by different methods alongside the ground truth MRMS data, according to some embodiments of the present invention.

As a more directly visualized example, FIG. 14 shows sample high-resolution forecasts by the different methods alongside ground truth MRMS data. Each column shows 9 geopatch-time instances, for a randomly selected TIGGE Interpolation ensemble member, an ensemble member of HREF called High-Resolution Rapid Refresh model (HRRR), and 4 sample forecasts generated by CorrectorGAN, according to some embodiments of the present invention.

Figure 15:
FIG. 15 shows full TIGGE ensembles corresponding to the geo-patches shown in FIG. 12.

FIG. 15 shows the full TIGGE ensembles corresponding to the geo-patches shown in FIG. 13. Comparing with the full TIGGE ensemble confirms that CorrectorGAN does indeed achieve large scale correction in certain instances.

These examples shown in FIG. 14 illustrate the CorrectorGAN model's strength and its typical behavior in regions with substantial rainfall. While not shown, in other exemplary patches with little to no rainfall observed, the generated forecasts also behave as desired, predicting little-to-no rain.

The CorrectorGAN model is able to correct for large-scale biases of TIGGE. This is evident, for example, in row 1, where the selected interpolated TIGGE ensemble member predicts little rain everywhere except along the left most edge. In contrast, all of the CorrectorGAN realizations predict precipitation more closely resembling the MRMS field. Other examples of this bias correction can be seen in rows 0, 2, and 8. This provides evidence that through the inclusion of total column water, 2m temperature, convective available potential energy and convective inhibition, the GAN is able to extract information about the probability of rainfall beyond just super-resolving the coarse-resolution inputs.

Furthermore, the CorrectorGAN model adds detail and small-scale extremes. In many cases, the CorrectorGAN predictions have significantly higher extreme values than the global TIGGE model, corresponding to those present in the MRMS and HREF fields, see for example rows 0, 2, 5, and 8. This, in combination with the improvements in the metrics, show that the CorrectorGAN model achieves its goal of improving extreme precipitation forecasts of global models, approaching the skill of regional high resolution models but at much reduced cost and effort.

Additional Exemplary Embodiments

Embodiments of the present invention utilize conditional GAN models to correct and downscale meteorological forecasts from a global numerical weather model. In contrast to a traditional super-resolution task, for the problem at hand the disclosed CorrectorGAN system also corrects errors in the input coarse forecast. This is accomplished through a novel two-stage architecture in the generator network, in which the coarse forecast is first mapped to a corrected distribution based on information about the weather situation, and this distribution is then mapped to a distribution of high-resolution, plausible predictions.

When comparing exemplary implementations of the present invention against an interpolation baseline and an operational high-resolution regional weather model, CorrectorGAN outperforms the interpolation baseline across all of the evaluation metrics and is close to the high-resolution model, even outperforming it in terms of reliability for extreme weather situations. In contrast to computational expensive regional weather models, CorrectorGAN is fast, cheap, and easily transferrable to other forecast downscaling applications in resource-limited geographical regions that do not have access to high-resolution models or observations.

In some embodiments of the present invention, larger training sets over longer training periods may be used. In some embodiments, the model is trained and used for longer lead time, e.g., beyond 12 hours. In some embodiments, a temporal component may be included in the model using recurrent neural network blocks to create temporally coherent realizations. In some embodiments, other weather variables may be incorporated as inputs, and further information about the local and surrounding weather situations may be provided to the model as conditioning contexts. Similarly, recent radar observations may be included as inputs to the CorrectorGAN to provide more temporal high-resolution context.

Exemplary Implementations of the System Architecture

Figure 16:
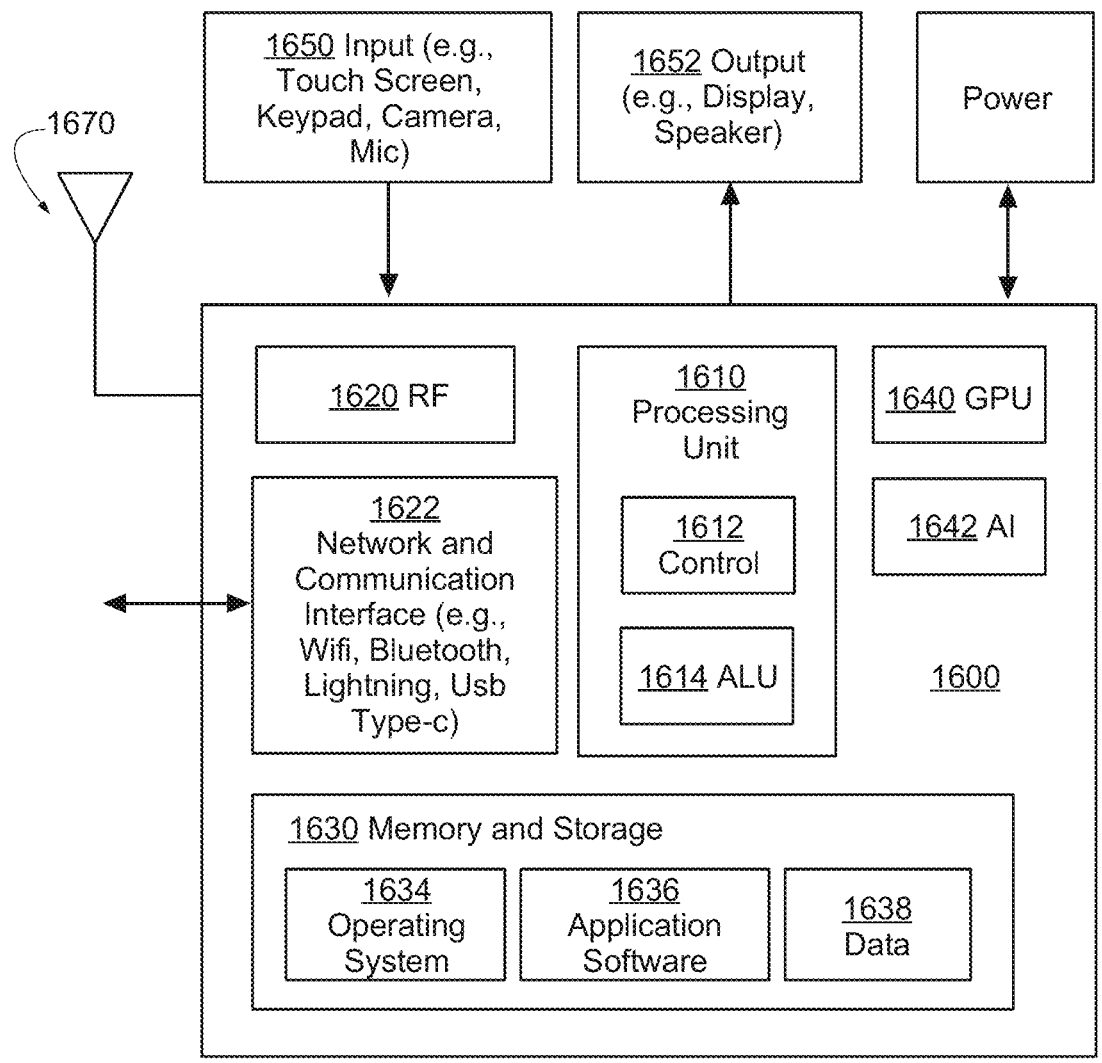
FIG. 16 is an exemplary schematic diagram of a client computing entity, according to some embodiments of the present invention.
Figure 17:
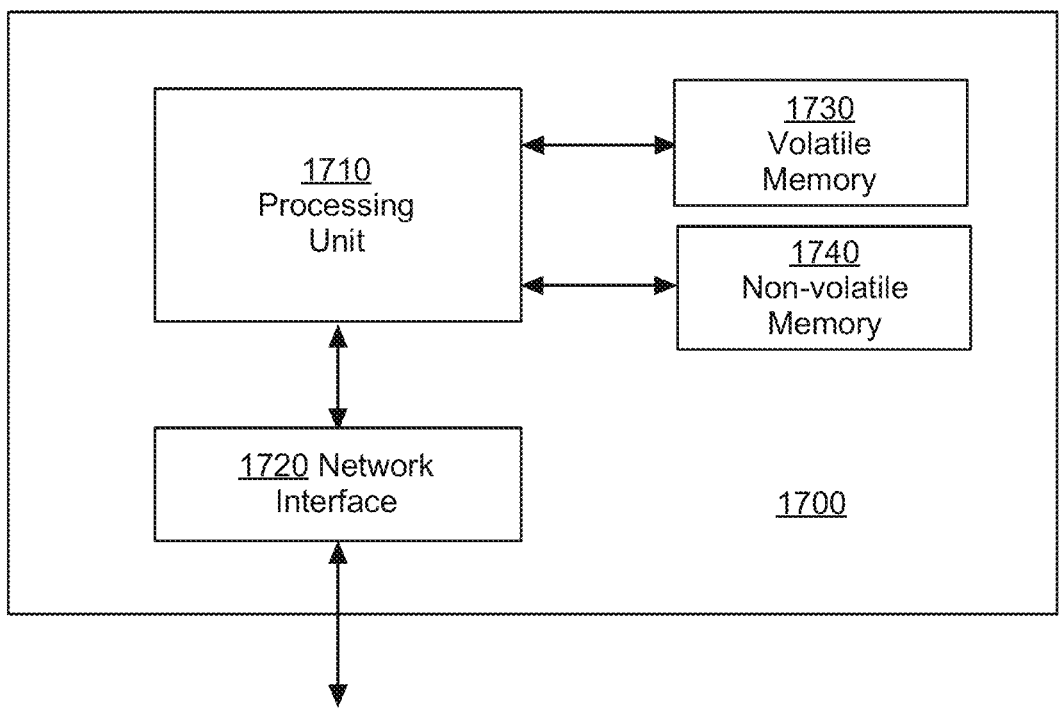
FIG. 17 is an exemplary schematic diagram of a management computing entity, according to some embodiments of the present invention.

In the next subsection, exemplary client computing entities and server management computing entities that may be used to implement different embodiments of the CLIMATEAI system such as shown in FIGS. 3, 7, 8A, 8B, and 9 are presented. The CLIMATEAI system may include one or more client computing entities 1600, connected through one or more networks, to one or more server or management computing entities 1700, as illustrated in FIGS. 16 and 17. Each of these components, entities, devices, systems, and similar words used herein interchangeably may be in direct or indirect communication with, for example, one another over the same or different wired or wireless networks. Additionally, while FIGS. 16 and 17 illustrate the various system entities as separate, standalone entities, the various embodiments are not limited to this particular architecture.

Exemplary Client Computing Entity

FIG. 16 is an exemplary schematic diagram 1600 of a client computing entity that may be used to implement CLIMATEAI system 300 in FIG. 3, according to exemplary embodiments of the present invention. That is, client computing entity 1600 may be used to collect or retrieve forecast targets from a user, to implement cGAN-based downscaling system 300, and/or to implement one or more of the modules or engines shown in FIG. 3. A computing device 1600 includes one or more components as shown in FIG. 16. As will be recognized, the architectures discussed and corresponding descriptions are provided in this section for illustrative purposes only and do not limit the scope of the present invention to these embodiments presented.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, computing device 1600 may be a general-purpose computing device with dedicated graphical processing and artificial intelligence modules. It may alternatively be implemented in the cloud, with logically and/or physically distributed architectures.

As shown in FIG. 16, computing entity 1600 may include an antenna 1670, a radio transceiver 1620, and a processing unit 1610 that provides signals to and receives signals from the transceiver. The signals provided to and received from the transceiver may include signaling information in accordance with air interface standards of applicable wireless systems. In this regard, computing entity 1600 may be capable of operating with one or more air interface standards, communication protocols, modulation types, and access types. More particularly, computing entity 1600 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, computing entity 1600 may operate in accordance with multiple wired communication standards and protocols, via a network and communication interface 1622.

Via these communication standards and protocols, computing entity 1600 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). Computing entity 1600 can also download changes, add-ons, and updates, for instance, to its firmware, software (e.g., including executable instructions, applications, program modules), and operating system.

In some implementations, processing unit 1610 may be embodied in several different ways. For example, processing unit 1610 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1610 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1610 may be configured for a particular use or configured to execute instructions stored in volatile or non-volatile media or otherwise accessible to the processing unit. As such, whether configured by hardware or computer program products, or by a combination thereof, processing unit 1610 may be capable of performing steps or operations according to embodiments of the present invention when configured accordingly.

In some embodiments, processing unit 1610 may comprise a control unit 1612 and a dedicated arithmetic logic unit 1614 (ALU) to perform arithmetic and logic operations. In some embodiments, user computing entity 1600 may comprise a graphics processing unit 1640 (GPU) for specialized parallel processing tasks, and/or an artificial intelligence (AI) accelerator 1642, also specialized for applications including artificial neural networks, and machine learning. In some embodiments, processing unit 1610 may be coupled with GPU 1640 and/or AI accelerator 1642 to distribute and coordinate processing tasks.

In some embodiments, computing entity 1600 may include a user interface, comprising an input interface 1650 and an output interface 1652, each coupled to processing unit 1610. User input interface 1650 may comprise any of a number of devices or interfaces allowing computing entity 1600 to receive data, such as a keypad (hard or soft), a touch display, a mic for voice/speech, and a camera for motion or posture interfaces. User output interface 1652 may comprise any of a number of devices or interfaces allowing computing entity 1600 to provide information to a user, such as through the touch display, or a speaker for audio outputs. In some embodiments, output interface 1652 may connect computing entity 1600 to an external loudspeaker or projector, for audio or visual output.

Computing entity 1600 may also include volatile and/or non-volatile storage or memory 1630, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1634, application software 1636, data 1638, databases, database instances, database management systems, programs, program modules, scripts, source code, object code, byte code, compiled code, interpreted code, machine code, executable instructions, and/or the like to implement the functions of computing entity 1600. As indicated, this may include a weather forecast correction and downscaling application that is resident on the entity or accessible through a browser or other interfaces for communicating with a management computing entity and/or various other computing entities.

In some embodiments, computing entity 1600 may communicate to external devices like other computing devices and/or access points to receive information such as software or firmware, or to send information from the memory of the computing entity to external systems or devices such as servers, computers, smartphones, and the like.

In some embodiments, two or more computing entities such as 1600 may establish connections using a network utilizing any of the networking protocols listed previously. In some embodiments, the computing devices may use a network interface such as 1622 to communicate with each other, such as by communicating data, content, information, and/or similar terms used herein interchangeably that can be transmitted, received, operated on, processed, displayed, stored, and/or the like.

In some embodiments, data such as weather forecasting results may be uploaded by one or more computing devices 1600 to a server such as 1700 shown in FIG. 7 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, dedicated algorithms including artificial intelligence-based machine learning algorithms may be used to perform at least one of the following: (i) pre-processing input weather or climate forecast data to homogenize spatial and/or temporal resolution, (ii) weighted sampling of input data based on target forecasting and downscaling application, (iii) rank and/or combine data from multiple global and/or regional forecast models into a data ensemble, (iv) correcting and/or downscaling forecast data, (v) train and/or validate one or more neural networks, and (vi) generate high-resolution forecast data and/or probabilistic forecast data.

To provide for or aid in the numerous determinations (e.g., determine, ascertain, infer, calculate, predict, prognose, estimate, derive, forecast, detect, compute, or generate) of forecasting processes described herein, components described herein may examine the entirety or a subset of data to which it is granted access and can provide for reasoning about or determine states of the system. Determinations may be employed to generate a probability distribution over states of interest, based on a consideration of data. Determinations may also refer to techniques employed for composing higher-level events from one or more datasets.

Such determinations may result in the construction of an optimization, convergence, forecast, projection, correction, and super-resolution from a set of simulation data. For example, components disclosed herein may employ various prediction and classification schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, schemes and/or systems as disclosed herein may be used to automatically learn and perform a number of functions, actions, and/or determinations.

Exemplary Management Computing Entity

FIG. 17 is an exemplary schematic diagram 1700 of a management computing entity for implementing a cGAN-based forecast downscaling system, according to exemplary embodiments of the present invention. The terms computing entity, computer, entity, device, system, and/or similar words used herein interchangeably are explained in detail with reference to client computing entity 1600. A management computing entity 1700 may be employed to implement components of CLIMATEAI system 300, to perform actions such as NN training, validation, testing, and weather/climate forecasting correction and super-resolution, possibly on demand via a remote connection. Management computing entity 1700 may also pre-process, aggregate, and post-process forecast results from one or more sources.

As indicated, in one embodiment, management computing entity 1700 may include one or more network or communications interface 1720 for communicating with various computing entities, such as by communicating data, content, information, and/or similar terms used herein interchangeably that can be transmitted, received, operated on, processed, displayed, stored, and/or the like. For instance, management computing entity 1700 may communicate with one or more client computing devices such as 1600 and/or a variety of other computing entities. Network or communications interface 1720 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1700 may be configured to communicate via wireless external communication networks using any of a variety of standards and protocols as discussed with reference to client computing device 1600.

As shown in FIG. 17, in one embodiment, management computing entity 1700 may include or be in communication with one or more processing unit 1710 (also referred to as processors, processing circuitry, processing element, and/or similar terms used herein interchangeably) that communicate with other elements within management computing entity 1700. Processing unit 1710 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1710 may be configured for a particular use or configured to execute instructions stored in volatile or non-volatile media 1730 and 1740. As such, whether configured by hardware or computer program products, or by a combination thereof, processing unit 1710 may be capable of performing steps or operations according to embodiments of the present disclosure when configured accordingly.

Although not shown explicitly, management computing entity 1700 may include or be in communication with one or more input elements, such as a keyboard, a mouse, a touch screen/display, and/or the like. Management computing entity 1700 may also include or be in communication with one or more output elements such as speaker, screen/display, and/or the like.

In various embodiments, one or more of the components of management computing entity 1700 may be located remotely from other management computing entity components, such as in a distributed system or in the cloud. Furthermore, one or more of the components may be combined and additional components performing functions described herein may be included in the management computing entity 1700.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks, which include Compact Disk Read-Only Memory (CD ROMS), Digital Versatile Disks (DVDs), etc., as well as digital and analog communication media.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap to practice the methods of the present invention.

CONCLUSIONS

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for training a generative adversarial network (GAN) for correcting and downscaling global numerical weather forecast data to generate an ensemble of forecast data for a target meteorological variable at a target spatial resolution, comprising:
pre-processing the global numerical weather forecast data to generate an ensemble of corrector input data at a first spatial resolution,
wherein the first spatial resolution is lower than the target spatial resolution,
wherein the GAN comprises a generator deep neural network (G-DNN) and a discriminator deep neural network (D-DNN),
wherein the G-DNN comprises a corrector deep neural network (C-DNN) followed by a super-resolver deep neural network (SR-DNN) having an output spatial resolution at the target spatial resolution, and
wherein the generated ensemble of corrector input data comprises data for the target meteorological variable and at least one context meteorological variable different from the target meteorological variable;
down-sampling observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices;
pre-training the C-DNN, using a first C-DNN loss function independent of the SR-DNN and D-DNN, wherein the first C-DNN loss function is computed based on a first C-DNN output generated from the ensemble of corrector input data, and the down-sampled observational data;
pre-training the SR-DNN, using a second SR-DNN loss function separate from the first C-DNN loss function and independent of the D-DNN, wherein the second SR-DNN loss function is computed based on the first C-DNN output, the down-sampled observational data, a first SR-DNN output generated from the first C-DNN output, and the observational data for the target meteorological variable; and
training the GAN, using a third D-DNN loss function computed based on a second C-DNN output generated from the ensemble of corrector input data and a random vector input.

2. The method of claim 1, further comprising:
generating the ensemble of forecast data for the target meteorological variable at the target spatial resolution, using the G-DNN.

3. The method of claim 1, further comprising:
generating a probabilistic forecast from the ensemble of forecast data for the target meteorological variable at the target spatial resolution.

4. The method of claim 1, wherein the target meteorological variable is precipitation accumulation, and wherein the at least one context meteorological variable is surface temperature, convective available potential energy, convective inhibition, or column water.

5. The method of claim 1, wherein the first loss C-DNN function is computed further based on a fractions skill score generated from the first C-DNN output and the down-sampled observational data.

6. The method of claim 1, wherein the third D-DNN loss function is computed further based on the down-sampled observational data.

7. The method of claim 1, further comprising:
weighted sampling the ensemble of corrector input data and the observational data.

8. The method of claim 1, wherein the C-DNN has a same input and output spatial resolution, and wherein the SR-DNN has an input spatial resolution at the first spatial resolution.

9. A system for training a generative adversarial network (GAN) for correcting and downscaling global numerical weather forecast data to generate an ensemble of forecast data for a target meteorological variable at a target spatial resolution, comprising:
at least one processor; and
a non-transitory physical storage medium for storing program code and accessible by the processor, the program code when executed by the processor causes the processor to:
pre-process the global numerical weather forecast data to generate an ensemble of corrector input data at a first spatial resolution,
wherein the first spatial resolution is lower than the target spatial resolution,
wherein the GAN comprises a generator deep neural network (G-DNN) and a discriminator deep neural network (D-DNN),
wherein the G-DNN comprises a corrector deep neural network (C-DNN) followed by a super-resolver deep neural network (SR-DNN) having an output spatial resolution at the target spatial resolution, and
wherein the generated ensemble of corrector input data comprises data for the target meteorological variable and at least one context meteorological variable different from the target meteorological variable;
down-sample observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices;
pre-train the C-DNN, using a first C-DNN loss function independent of the SR-DNN and D-DNN, wherein the first C-DNN loss function is computed based on a first C-DNN output generated from the ensemble of corrector input data, and the down-sampled observational data;
pre-train the SR-DNN, using a second SR-DNN loss function separate from the first C-DNN loss function and independent of the D-DNN, wherein the second SR-DNN loss function is computed based on the first C-DNN output, the down-sampled observational data, a first SR-DNN output generated from the first C-DNN output, and the observational data for the target meteorological variable; and
train the GAN, using a third D-DNN loss function computed based on a second C-DNN output generated from the ensemble of corrector input data and a random vector input.

10. The system of claim 9, wherein the program code when executed by the processor further causes the processor to:
generate the ensemble of forecast data for the target meteorological variable at the target spatial resolution, using the G-DNN.

11. The system of claim 9, wherein the program code when executed by the processor further causes the processor to:
generate a probabilistic forecast from the ensemble of forecast data for the target meteorological variable at the target spatial resolution.

12. The system of claim 9, wherein the target meteorological variable is precipitation accumulation, and wherein the at least one context meteorological variable is surface temperature, convective available potential energy, convective inhibition, or column water.

13. The system of claim 9, wherein the first C-DNN loss function is computed further based on a fractions skill score generated from the first C-DNN output and the down-sampled observational data.

14. The system of claim 9, wherein the third D-DNN loss function is computed further based on the down-sampled observational data.

15. The system of claim 9, wherein the program code when executed by the processor further causes the processor to:
weighted sample the ensemble of corrector input data and the observational data.

16. The system of claim 9, wherein the C-DNN has a same input and output spatial resolution, and wherein the SR-DNN has an input spatial resolution at the first spatial resolution.

17. A non-transitory physical storage medium for training a generative adversarial network (GAN) for correcting and downscaling global numerical weather forecast data to generate an ensemble of forecast data for a target meteorological variable at a target spatial resolution, the storage medium comprising program code stored thereon, that when executed by a processor causes the processor to:
pre-process the global numerical weather forecast data to generate an ensemble of corrector input data at a first spatial resolution,
wherein the first spatial resolution is lower than the target spatial resolution,
wherein the GAN comprises a generator deep neural network (G-DNN) and a discriminator deep neural network (D-DNN),
wherein the G-DNN comprises a corrector deep neural network (C-DNN) followed by a super-resolver deep neural network (SR-DNN) having an output spatial resolution at the target spatial resolution, and
wherein the generated ensemble of corrector input data comprises data for the target meteorological variable and at least one context meteorological variable different from the target meteorological variable;
down-sample observational data for the target meteorological variable from a second spatial resolution to the first spatial resolution, wherein the second spatial resolution is higher than the first spatial resolution, and wherein the observational data for the target meteorological variable corresponds to the ensemble of corrector input data over geopatch-time indices;
pre-train the C-DNN, using a first C-DNN loss function independent of the SR-DNN and D-DNN, wherein the first C-DNN loss function is computed based on a first C-DNN output generated from the ensemble of corrector input data, and the down-sampled observational data;
pre-train the SR-DNN, using a second SR-DNN loss function separate from the first C-DNN loss function and independent of the D-DNN, wherein the second SR-DNN loss function is computed based on the first C-DNN output, the down-sampled observational data, a first SR-DNN output generated from the first C-DNN output, and the observational data for the target meteorological variable; and
train the GAN, using a third D-DNN loss function computed based on a second C-DNN output generated from the ensemble of corrector input data and a random vector input.

18. The non-transitory physical storage medium of claim 17, wherein the target meteorological variable is precipitation accumulation, and wherein the at least one context meteorological variable is surface temperature, convective available potential energy, convective inhibition, or column water.

19. The non-transitory physical storage medium of claim 17, wherein the first C-DNN loss function is computed further based on a fractions skill score generated from the first C-DNN output and the down-sampled observational data.

20. The non-transitory physical storage medium of claim 17, wherein the third D-DNN loss function is computed further based on the down-sampled observational data.

* * * * *